(12) United States Patent
Maeda et al.

(10) Patent No.: US 10,211,036 B2
(45) Date of Patent: Feb. 19, 2019

(54) JET FLOW GENERATION DEVICE, AND JET FLOW GENERATION SYSTEM

(71) Applicants: DENSO CORPORATION, Kariya, Aichi-pref. (JP); SOKEN, INC., Nishio, Aichi-pref. (JP)

(72) Inventors: Noboru Maeda, Nishio (JP); Koji Ito, Kariya (JP); Kiyokazu Akiyama, Nishio (JP); Masayoshi Satake, Nishio (JP)

(73) Assignees: DENSO CORPORATION, Kariya, Aichi-pref. (JP); SOKEN, INC., Nishio, Aichi-pref. (JP)

( * ) Notice: Subject to any disclaimer, the term of this patent is extended or adjusted under 35 U.S.C. 154(b) by 0 days.

(21) Appl. No.: 15/744,491

(22) PCT Filed: Aug. 11, 2016

(86) PCT No.: PCT/JP2016/073690
§ 371 (c)(1),
(2) Date: Jan. 12, 2018

(87) PCT Pub. No.: WO2017/030078
PCT Pub. Date: Feb. 23, 2017

(65) Prior Publication Data
US 2018/0204710 A1    Jul. 19, 2018

(30) Foreign Application Priority Data

Aug. 19, 2015 (JP) ................. 2015-162068

(51) Int. Cl.
*H01J 41/12*    (2006.01)
*H01T 19/04*    (2006.01)
(Continued)

(52) U.S. Cl.
CPC ............. *H01J 41/12* (2013.01); *F03G 7/06* (2013.01); *F04D 33/00* (2013.01); *H01T 19/04* (2013.01); *H01T 23/00* (2013.01)

(58) Field of Classification Search
None
See application file for complete search history.

(56) References Cited

U.S. PATENT DOCUMENTS 3,054,553 A    9/1962  White et al.
2003/0234618 A1    12/2003  Krichtafovitch
(Continued)

FOREIGN PATENT DOCUMENTS

JP    2004335134 A    11/2004
JP    2007293066 A    11/2007
(Continued)

OTHER PUBLICATIONS

Yasuhide Fukumoto, "Vortex Ring", Fundamentals of Vortex Motion, MAGARE25, Kyushu University, 2006, pp. 265-280.
(Continued)

*Primary Examiner* — Dedei K Hammond
(74) *Attorney, Agent, or Firm* — Harness, Dickey & Pierce, P.L.C.

(57) ABSTRACT

A jet flow generation device includes: a discharge electrode; a reference electrode that is disposed away from the discharge electrode; a power supply circuit that generates an output voltage to control a potential difference between the discharge electrode and the reference electrode; a controller that switches the output voltage of the power supply circuit between a first voltage that does not induce corona discharge between the discharge electrode and the reference electrode and a second voltage that induces corona discharge between the discharge electrode and the reference electrode; and a case housing at least the reference electrode has an injection (Continued)

port that injects an ion wind of ions generated by the corona discharge.

19 Claims, 31 Drawing Sheets

(51) Int. Cl.
  *F04D 33/00*  (2006.01)
  *F03G 7/06*  (2006.01)
  *H01T 23/00*  (2006.01)

(56) References Cited

U.S. PATENT DOCUMENTS

| | | |
|---|---|---|
| 2004/0004440 A1 | 1/2004 | Krichtafovitch et al. |
| 2004/0004797 A1 | 1/2004 | Krichtafovitch et al. |
| 2004/0155612 A1 | 8/2004 | Krichtafovitch |
| 2004/0183454 A1 | 9/2004 | Krichtafovitch |
| 2004/0212329 A1 | 10/2004 | Krichtafovitch et al. |
| 2004/0217720 A1 | 11/2004 | Krichtafovitch et al. |
| 2005/0151490 A1 | 7/2005 | Krichtafovitch |
| 2006/0055343 A1 | 3/2006 | Krichtafovitch et al. |
| 2006/0236859 A1 | 10/2006 | Krichtafovitch |
| 2007/0046219 A1 | 3/2007 | Krichtafovitch et al. |
| 2007/0247077 A1 | 10/2007 | Krichtafovitch |
| 2009/0244802 A1* | 10/2009 | Takeuchi ............ F02P 9/007 361/247 |
| 2014/0147308 A1 | 5/2014 | Fujiwara et al. |
| 2015/0224516 A1 | 8/2015 | Tanaka et al. |
| 2015/0282286 A1* | 10/2015 | Gefter ............ H05F 3/06 134/1.1 |

FOREIGN PATENT DOCUMENTS

| | | |
|---|---|---|
| JP | 2008188189 A | 8/2008 |
| JP | 2008202462 A | 9/2008 |
| JP | 2010010138 A | 1/2010 |
| JP | 5038869 B2 | 10/2012 |
| JP | 2014057660 A | 4/2014 |
| WO | WO-2012176228 A | 12/2012 |

OTHER PUBLICATIONS

John M. Lawson and Janes R. Dawson, "The formation of turbulent vortex rings by synthetic jets", Physics of Fluids, Oct. 28, 2013, vol. 25 105113 (2013), <http://aip.scitation.org/doi/abs.10.1063/1.866920>.

* cited by examiner

JET FLOW GENERATION DEVICE, AND JET FLOW GENERATION SYSTEM

CROSS REFERENCE TO RELATED APPLICATIONS

This application is a U.S. National Phase Application under 35 U.S.C. 371 of International Application No. PCT/JP2016/073690 filed on Aug. 11, 2016 and published in Japanese as WO 2017/030078 A1 on Feb. 23, 2017. This application is based on and claims the benefit of priority from Japanese Patent Application No. 2015-162068 filed on Aug. 19, 2015. The entire disclosures of all of the above applications are incorporated herein by reference.

TECHNICAL FIELD

The present disclosure relates to a jet flow generation device and a jet flow generation system to inject a jet flow.

BACKGROUND ART

Patent Literature 1 describes an apparatus including an air chamber, and a discharge port communicating with the air chamber. The apparatus further includes an air cannon, a rod, and a cam. The air cannon discharges an air vortex by changing the volume of the air chamber. The rod is provided to the air cannon and is movable to an advanced position where the air chamber is reduced and a retracted position where the air chamber is expanded. The cam is attached to the rod with the center of rotation tilted relative to the rod, and moves the rod to the advanced position and the retracted position. The apparatus is configured such that the rod is moved instantaneously by rotation of the cam to cause the air in the air chamber to be injected from the discharge port to generate an air vortex ring.

PRIOR ART LITERATURES

Patent Literature

Patent Literature 1: JP 5038869 B2

SUMMARY OF INVENTION

The apparatus described in Patent Literature 1 is configured to instantaneously move the rod being a mechanical mechanism at a high speed, thereby generating an impact noise. The apparatus cannot control factors other than the rotational speed of the cam and thus cannot make a minor change to the characteristic of a jet injected from the discharge port.

In view of the above issues, the present disclosure aims at making a minor change to the characteristic of a jet while ensuring quietness.

According to an aspect of the present disclosure, a jet flow generation device includes: a discharge electrode; a reference electrode that is disposed away from the discharge electrode; a power supply circuit that generates an output voltage to control a potential difference between the discharge electrode and the reference electrode; a controller that switches the output voltage of the power supply circuit between a first voltage that does not induce corona discharge between the discharge electrode and the reference electrode and a second voltage that induces corona discharge between the discharge electrode and the reference electrode; and a case housing at least the reference electrode has an injection port that injects an ion wind of ions generated by the corona discharge.

According to the above configuration, the controller switches the output voltage of the power supply circuit between the first voltage not inducing the corona discharge between the discharge electrode and the reference electrode and the second voltage inducing the corona discharge between the discharge electrode and the reference electrode, so that the ion wind of the ions generated by the corona discharge is injected as a jet from the injection port and that a minor change can be made to the characteristic of the jet while ensuring quietness.

According to another aspect, a jet flow generation system includes: a plurality of jet flow generation devices; a confluence part that merges jet flows injected from injection ports of the jet flow generation devices; and a guide path that guides the jet flows injected from the injection ports of the jet flow generation devices to the confluence part.

DESCRIPTION OF EMBODIMENTS

Figure 1:
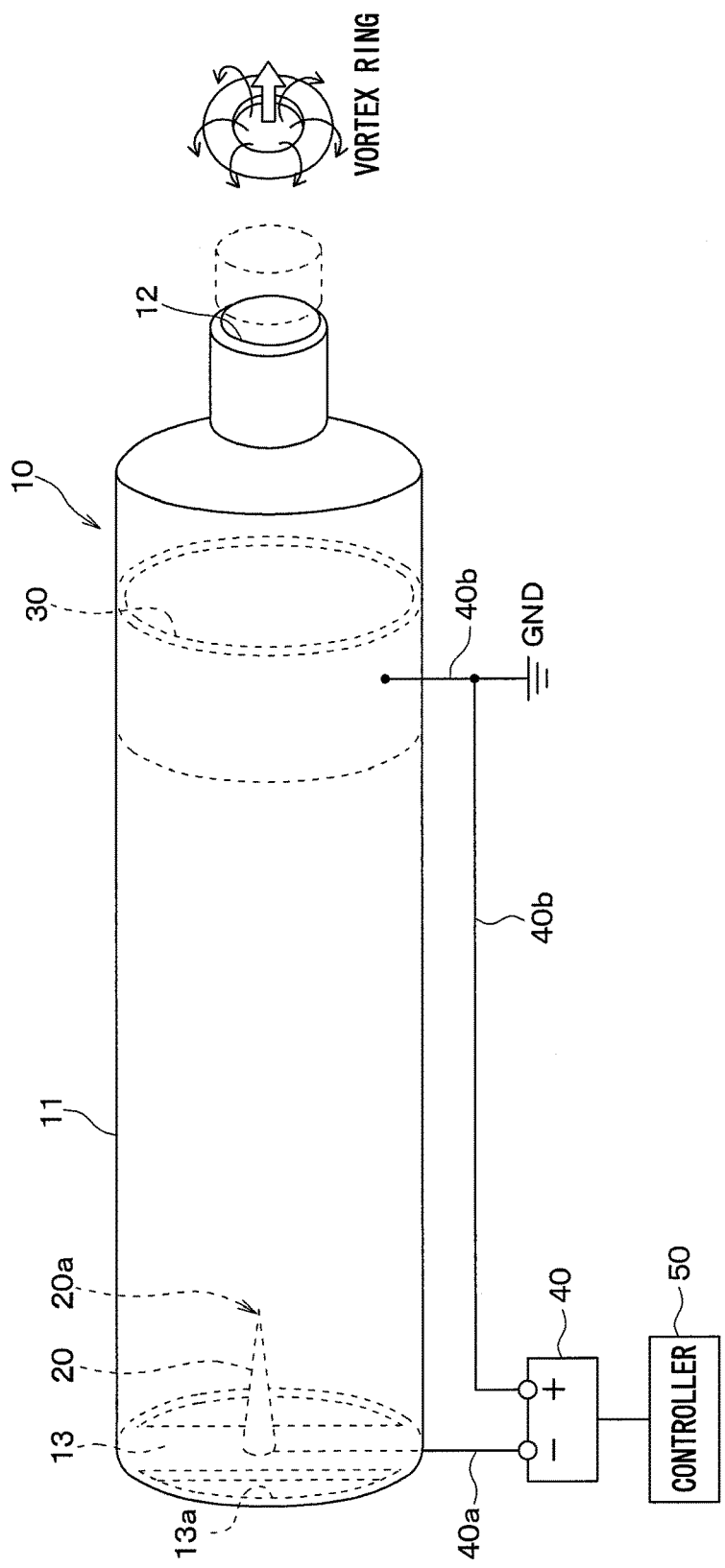
FIG. 1 is a diagram illustrating a configuration of a jet generator according to a first embodiment.

Hereinafter, embodiments will be described according to the drawings. Same or equivalent portions among respective embodiments below are labeled with same reference numerals in the drawings.

First Embodiment

FIG. 1 illustrates a configuration of a jet generator according to a first embodiment. The jet generator is mounted to a meter or the like of a vehicle so as to inject a jet toward the face of an occupant of the vehicle and deliver an air vortex ring in order to improve comfort.

The jet generator includes a case 10, a discharge electrode 20, a reference electrode 30, a power supply circuit 40, and a controller 50. FIG. 1 is illustrated such that the interior of the case 10 is seen through.

The case 10 houses the reference electrode 30 and the discharge electrode 20. The case 10 includes a body 11 having a hollow cylindrical shape, an injection nozzle 12 having a cylindrical shape and injecting an ion wind of ions generated by a corona discharge to be described later, and a support 13. The body 11, the injection nozzle 12, and the support 13 are made of an insulating member. The injection nozzle 12 corresponds to an injection port.

An opening 13a through which air outside the case 10 is taken into the case 10 is formed on one longitudinal end of the body 11. The support 13 is formed in the opening 13a. The injection nozzle 12 having the cylindrical shape is formed on another longitudinal end of the body 11. The injection nozzle 12 is smaller in diameter than the body 11. That is, the hydraulic diameter of an air passage in the injection nozzle 12 is smaller than the hydraulic diameter of an air passage in the body 11. The reference electrode 30 made of a conductive metal is provided between the discharge electrode 20 and the injection nozzle 12 in the body 11.

The discharge electrode 20 is a discharge electrode with a tip 20a having a needle shape. The discharge electrode 20 is formed of a member made of a conductive metal (such as copper). The discharge electrode 20 is supported by the support 13 such that the tip 20a is positioned on an inner surface side of the case 10. An insulating member (not shown) is provided between the discharge electrode 20 and the case 10, whereby the discharge electrode 20 and the case 10 are insulated from each other.

The reference electrode 30 is a reference electrode having a hollow cylindrical shape. The reference electrode 30 is disposed in the case 10 such that an outer peripheral surface of the reference electrode 30 is in contact with an inner peripheral surface of the case 10.

The power supply circuit 40 generates an output voltage that controls a potential difference between the discharge electrode 20 and the reference electrode 30. The power supply circuit 40 has a positive terminal and a negative terminal. The negative terminal of the power supply circuit 40 is connected to the discharge electrode 20 via wiring 40a. The positive terminal of the power supply circuit 40 is connected to the discharge electrode 20 and a ground terminal GND via wiring 40b. The power supply circuit 40 can output an output voltage of 3 kV or higher. The power supply circuit 40 can also output a rectangular voltage.

The controller 50 is configured as a computer including a CPU, a RAM, a ROM, an I/O, and the like where the CPU executes various types of processing in accordance with a program stored in the ROM.

The controller 50 of the present embodiment switches the output voltage of the power supply circuit 40 between a first voltage not inducing a corona discharge between the discharge electrode 20 and the reference electrode 30, and a second voltage inducing a corona discharge between the discharge electrode 20 and the reference electrode 30. As a result, an ion wind generated by the corona discharge is injected as a jet from the injection nozzle 12. In the present embodiment, the first voltage is set to −2 kilovolts and the second voltage is set to −3 kilovolts.

Figure 2:
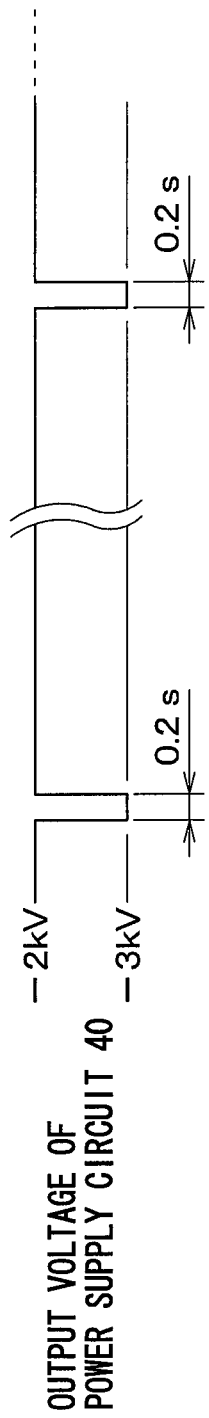
FIG. 2 is a diagram illustrating an output waveform of a power supply circuit of the jet generator according to the first embodiment.

The operation of the jet generator will now be described with reference to FIGS. 2 and 3. First, as illustrated in FIG. 2, the controller 50 controls the power supply circuit 40 such that a voltage of −2 kV is output from the power supply circuit 40. As a result, the potential of the discharge electrode 20 equals −2 kV, and the potential of the reference electrode 30 equals 0 V. A corona discharge does not occur around the discharge electrode 20 when the output voltage of the power supply circuit 40 is set to −2 kV.

Next, the controller 50 controls the power supply circuit 40 such that a voltage of −3 kV is output from the power supply circuit 40 for a certain period of time. The certain period of time is set to 0.2 seconds in the present embodiment. As a result, the potential of the discharge electrode 20 equals −3 kV, and the potential of the reference electrode 30 equals 0 V. When the voltage of −3 kV is applied between the discharge electrode 20 and the reference electrode 30, a high electric field is generated in the vicinity of the tip 20a of the discharge electrode 20, so that a corona discharge is induced around the discharge electrode 20 as illustrated in range R1 of FIG. 3 and that a corona discharge is generated between the discharge electrode 20 and the reference electrode 30.

Figure 3:
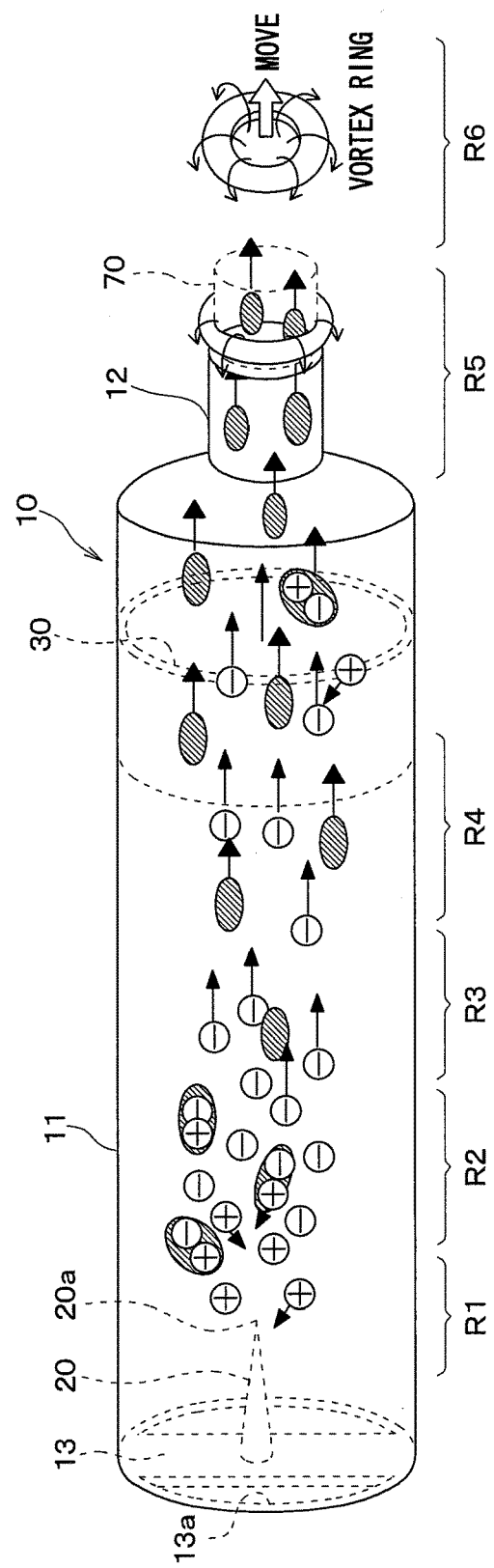
FIG. 3 is a diagram for illustrating generation of an ion wind.

The generation of the corona discharge causes the air around the discharge electrode 20 to be ionized into air ions as illustrated in range R2 of FIG. 3. Specifically, the air around the discharge electrode 20 is ionized to generate positive ions and negative ions.

Then as illustrated in range R3 of FIG. 3, the negative ions are accelerated by the electric field between the electrodes to move toward the reference electrode 30. Moreover, as illustrated in range R4 of FIG. 3, the air around the discharge electrode 20 and the reference electrode 30 is entrained as the negative ions move toward the reference electrode 30, whereby an ion wind is generated and injected from the injection nozzle 12 out of the case 10. A part of the negative ions in the case 10 is absorbed via the ground terminal GND, another part of the negative ions in the case 10 stays as ions in the case 10, and the remaining part of the negative ions in the case 10 is injected from the injection nozzle 12 to the outside of the case 10 together with the surrounding air.

At this time, a core 70 of an air jet having a cylindrical shape is blown out from the injection nozzle 12 as illustrated in range R5 of FIG. 3. The core 70 of the air jet blown out from the injection nozzle 12 forms a vortex ring by friction with the surrounding stationary air, as illustrated in range R6 of FIG. 3. The vortex ring of air is generated as a result.

When the controller 50 controls the power supply circuit 40 such that the output voltage of the power supply circuit 40 equals −2 kV again, a voltage of −2 kV is applied between the discharge electrode 20 and the reference electrode 30. The electric field in the vicinity of the discharge electrode 20 is reduced at this time, so that the corona discharge ceases and that no ion wind is generated. The ion wind is intermittently injected from the injection nozzle 12 formed on the case 10 by repeating the aforementioned process.

After the ion wind is injected from inside the case 10 through the injection nozzle 12, the air outside the case 10 is introduced into the case 10 through the opening 13a formed on the case 10. That is, the air outside the case 10 is introduced into the case 10 through the opening 13a on the one longitudinal end of the body 11, whereas the ion wind is injected from the injection nozzle 12 on the other longitudinal end of the body 11.

Figure 4:
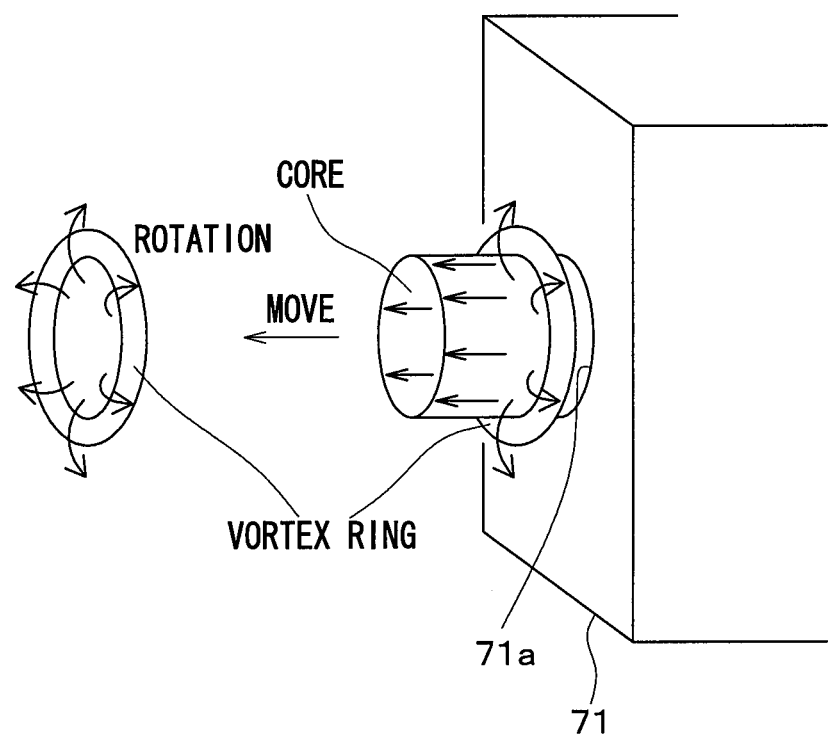
FIG. 4 is a diagram for illustrating generation of a vortex ring.

Next, generation of a vortex ring will be described with reference to FIG. 4. FIG. 4 illustrates how the air exits from a round hole 71a formed on a cardboard box 71 when the cardboard box 71 is hit.

A flow of fluid blown out of a hole as in the figure is called a jet. The air exiting the hole in a cylindrical shape is called a core. The core decelerates rapidly due to the blowout being instantaneous and viscous friction with the surrounding stationary flow, and thus weakens in a short time and a short distance.

When the air exits the cardboard box, the viscous friction acts between the fast flow of the core and the surrounding stationary air to create a vortex by the action of force causing the surrounding air to rotate.

The vortex is formed continuously around the core like a ring and is called a vortex ring. The vortex ring thus formed can move forward by the action of its own rotation even after the core diminishes, and can move a relatively long distance.

The jet generator injects the ion wind generated by the corona discharge as the jet from the injection nozzle 12, as illustrated in FIG. 1. The vortex ring of air is generated as a result and propagates in an axial direction of the injection nozzle 12 having the cylindrical shape.

According to the above configuration, the controller 50 switches the output voltage of the power supply circuit 40 between the first voltage not inducing the corona discharge between the discharge electrode 20 and the reference electrode 30 and the second voltage inducing the corona discharge between the discharge electrode 20 and the reference electrode 30, so that the ion wind of the ions generated by the corona discharge is injected as the jet from the injection nozzle 12 and that a minor change can be made to the characteristic of the jet while ensuring quietness.

The present embodiment is configured to apply, for 0.2 seconds, the second voltage inducing the corona discharge between the discharge electrode 20 and the reference electrode 30. However, the duration of application of the second voltage between the discharge electrode 20 and the reference electrode 30 can be changed. The output voltage of the power supply circuit 40 is set to −3 kV as the second voltage inducing the corona discharge between the discharge electrode 20 and the reference electrode 30. The second voltage can be changed, however. The cycle of application of the second voltage between the discharge electrode 20 and the reference electrode 30 can also be changed.

For example, the voltage applied between the discharge electrode 20 and the reference electrode 30 can be controlled such that the velocity of the jet injected from the injection nozzle 12 is high initially, is reduced after the lapse of a predetermined period of time, and is high again. Formation and propulsion of the vortex ring can thus be controlled as desired.

The case 10 has the opening 13a through which the air outside the case 10 is taken into the case at a position different from the position of the injection nozzle 12, so that the air outside the case 10 need not be taken into the case through the injection nozzle 12 but can be quickly taken into the case 10 through the opening 13a to be injected as the jet from the injection nozzle 12.

Second Embodiment

Figure 5:
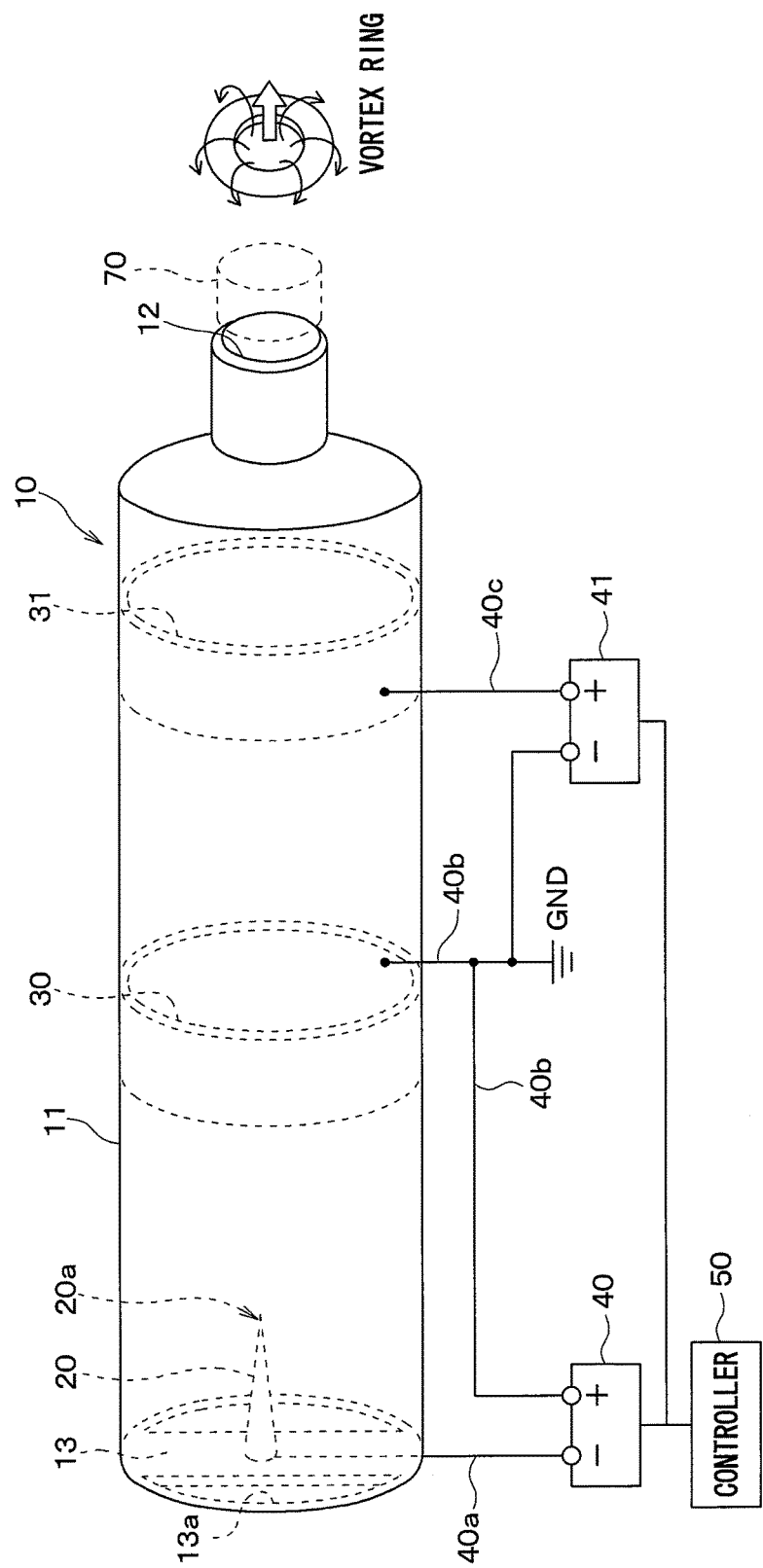
FIG. 5 is a diagram illustrating a configuration of a jet generator according to a second embodiment.

FIG. 5 illustrates a configuration of a jet generator according to a second embodiment. The configuration of the jet generator of the present embodiment is different from that of the first embodiment in that a control electrode 31 and a power supply circuit 41 are further included.

The control electrode 31 is disposed between a reference electrode 30 and an injection nozzle 12 formed on a case 10. The control electrode 31 is a control electrode having a hollow cylindrical shape, and is made of a conductive metal member (such as copper). The reference electrode 30 is disposed in the case 10 such that an outer peripheral surface of the reference electrode 30 is in contact with an inner peripheral surface of the case 10.

The power supply circuit 41 generates an output voltage that controls a potential difference between the reference electrode 30 and the control electrode 31. The power supply circuit 41 has a positive terminal and a negative terminal. The negative terminal of the power supply circuit 41 is connected to the reference electrode 30, a positive terminal of a power supply circuit 40, and a ground terminal GND via wiring 40b. The positive terminal of the power supply circuit 41 is connected to the control electrode 31 via wiring 40c. The case 10 is insulated from each of the positive terminal and the negative terminal.

The power supply circuit 41 can output an output voltage in a range higher than or equal to −3 kV and lower than or equal to 3 kV. The power supply circuit 41 can also output a rectangular voltage.

A controller 50 of the present embodiment controls an output voltage of the power supply circuit 40 and the output voltage of the power supply circuit 41.

Figure 6:
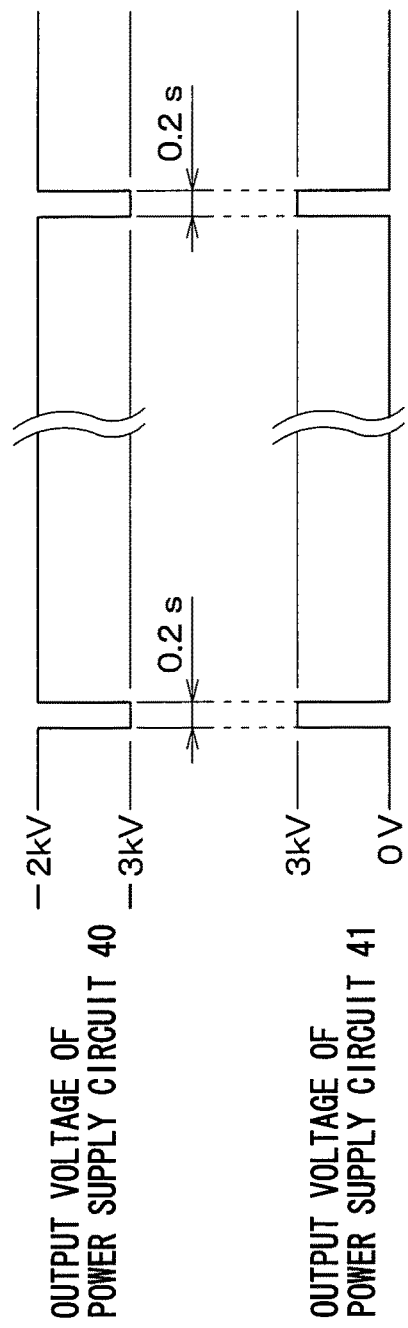
FIG. 6 is a diagram illustrating an output waveform of a power supply circuit of the jet generator according to the second embodiment.

The operation of the jet generator will now be described with reference to FIGS. 6 and 7. First, as illustrated in FIG. 6, the controller 50 controls the power supply circuit 40 such that a voltage of −2 kV is output from the power supply circuit 40. As a result, the potential of a discharge electrode 20 equals −2 kV, and the potential of the reference electrode 30 equals 0 V. A corona discharge does not occur around the discharge electrode 20 when the output voltage of the power supply circuit 40 is set to −2 kV.

At the same time, the controller 50 controls the power supply circuit 41 such that the output voltage of the power supply circuit 41 equals 0 V. As a result, the potential of each of the control electrode 31 and the reference electrode 30 equals 0 V.

The controller 50 thereafter controls the power supply circuit 40 such that a voltage of −3 kV is output from the power supply circuit 40 for a certain period of time, and also controls the power supply circuit 41 such that a voltage of 3 kV is output from the power supply circuit 41 for the same certain period of time. The certain period of time is set to 0.2 seconds in the present embodiment. The controller 50 controls the power supply circuit 40 and the power supply circuit 41 such that the output voltage of the power supply circuit 40 and the output voltage of the power supply circuit 41 are switched at the same time. As a result, the potential of the discharge electrode 20 equals −3 kV, the potential of the reference electrode 30 equals 0 V, and the potential of the control electrode 31 equals 3 kV.

Figure 7:
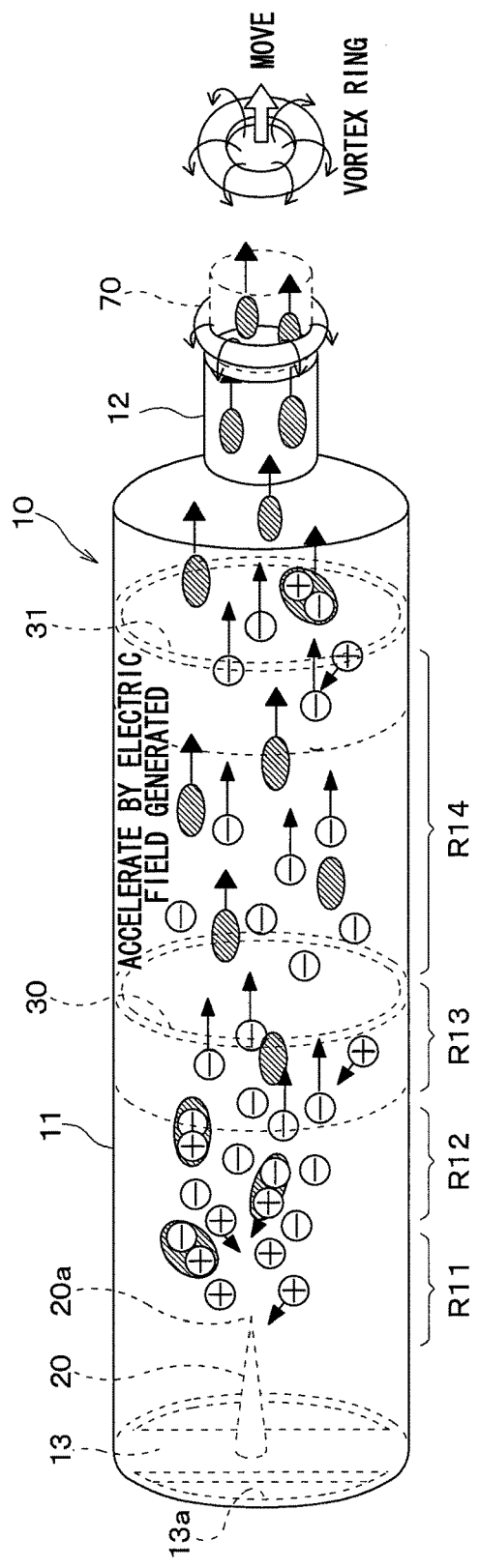
FIG. 7 is a diagram for illustrating generation of an ion wind in the jet generator according to the second embodiment.

When the voltage of −3 kV is applied between the discharge electrode 20 and the reference electrode 30 as described above, a high electric field is generated in the vicinity of a tip 20a of the discharge electrode 20, so that a corona discharge is induced around the discharge electrode 20 as illustrated in range R11 of FIG. 7 and that a corona discharge is generated between the discharge electrode 20 and the reference electrode 30.

The generation of the corona discharge causes the air around the discharge electrode 20 to be ionized into air ions as illustrated in range R12 of FIG. 7. Specifically, the air around the discharge electrode 20 is ionized to generate positive ions and negative ions.

Then as illustrated in range R13 of FIG. 7, the negative ions are accelerated by the electric field between the electrodes to move toward the reference electrode 30. Moreover, as illustrated in range R14 of FIG. 7, the air around the discharge electrode 20 and the reference electrode 30 is entrained as the negative ions move toward the reference electrode 30, whereby an ion wind is generated.

An electric field is generated between the reference electrode 30 and the control electrode 31 since the potential of the control electrode 31 equals 3 kV and the potential of the reference electrode 30 equals 0 V. Accordingly, the negative ions are accelerated in the process of moving toward the control electrode 31 after passing through the reference electrode 30, whereby a larger ion wind is generated. After passing through the control electrode 31, the ion wind is blown out from the injection nozzle 12 as a jet. A part of the negative ions in the case 10 is absorbed via the ground terminal GND, another part of the negative ions in the case 10 stays as ions in the case 10, and the remaining part of the negative ions in the case 10 is injected from the injection nozzle 12 to the outside of the case 10 together with the surrounding air.

As described above, the jet generator includes the control electrode 31 disposed between the reference electrode 30 and the injection nozzle 12 in the case 10, and the power supply circuit 41 that outputs a voltage to be applied between the reference electrode 30 and the control electrode 31. The controller 50 controls the output voltage of the power supply circuit 41 such that the ion wind generated by the corona discharge in the case 10 is accelerated toward the injection nozzle 12 during the period of switching the output voltage of the power supply circuit 40 from a first voltage to a second voltage. As a result, the negative ions generated by the corona discharge are accelerated by the electric field between the reference electrode 30 and the control electrode 31, whereby the larger ion wind can be generated. That is, the jet can be injected from the injection nozzle 12 at a higher speed than the jet generator of the first embodiment.

The present embodiment can also obtain the effect similar to that of the first embodiment by the configuration common to that of the first embodiment.

Third Embodiment

A jet generator according to a third embodiment will now be described. The configuration of the jet generator of the present embodiment is the same as that of the second embodiment.

Figure 8:
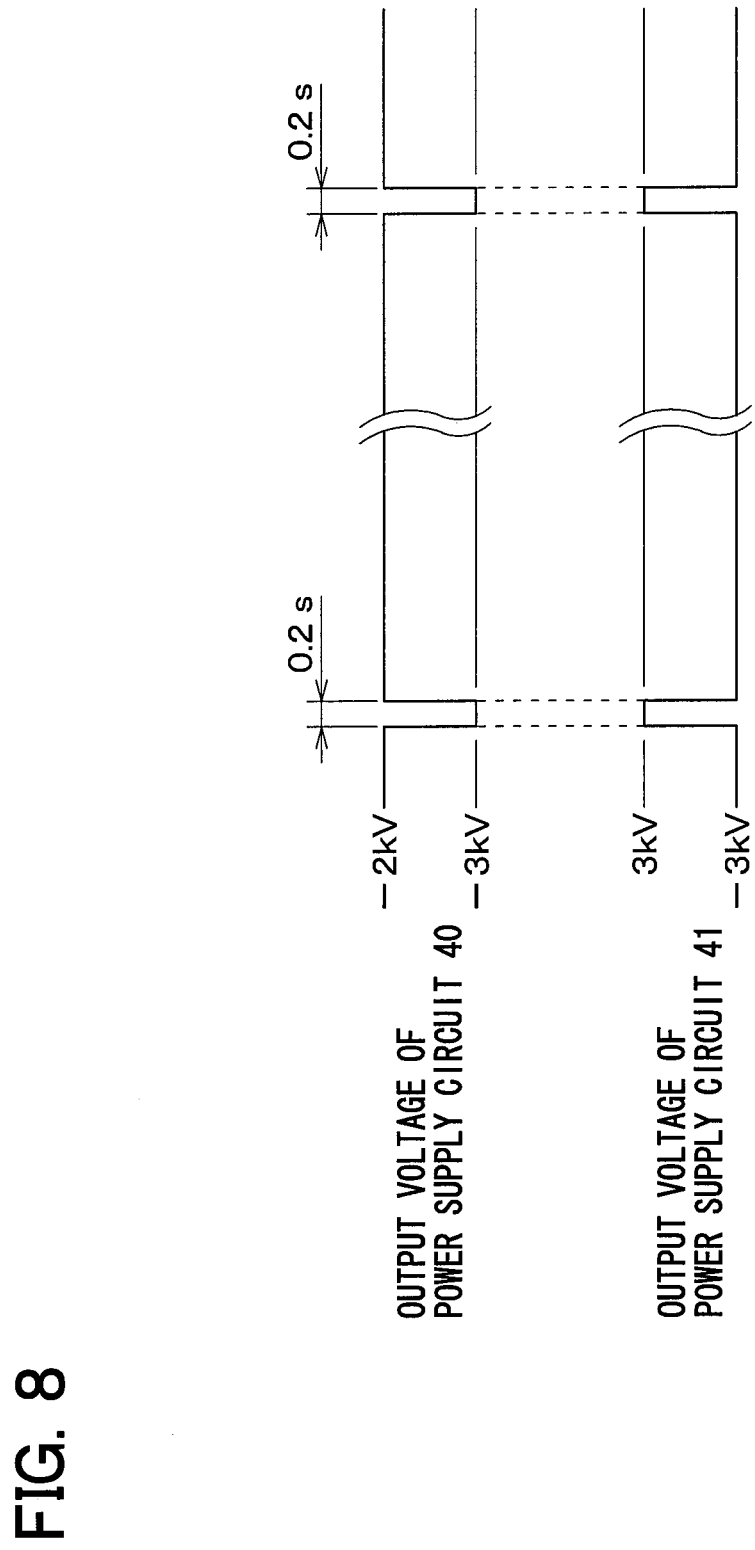
FIG. 8 is a diagram illustrating an output waveform of a power supply circuit of a jet generator according to a third embodiment.

The jet generator of the second embodiment controls the power supply circuit 41 such that the output voltage of the power supply circuit 41 is switched from 0 V to 3 kV and maintained at 3 kV while the output voltage of the power supply circuit 40 is switched from −2 kV to −3 kV and maintained at −3 kV. On the other hand, the jet generator of the present embodiment controls a power supply circuit 41 such that an output voltage of the power supply circuit 41 is switched from −3 kV to 3 kV and maintained at 3 kV while an output voltage of a power supply circuit 40 is switched from −2 kV to −3 kV and maintained at −3 kV, as illustrated in FIG. 8. The present embodiment is different from the first embodiment in the above respect.

When a corona discharge is intermittently generated between a discharge electrode 20 and a reference electrode 30, negative ions generated by a previous corona discharge may be left inside a case 10 in some cases.

Therefore, a controller 50 of the present embodiment controls the power supply circuit 40 and the power supply circuit 41 such that the output voltage of the power supply circuit 41 equals −3 kV while the output voltage of the power supply circuit 40 equals −2 kV. Such control causes the potential of a control electrode 31 to be lower than that of the reference electrode 30, thereby allowing the negative ions generated by the previous corona discharge and the ions existing between the reference electrode 30 and the control electrode 31 to move toward the reference electrode 30. That is, the ions existing between the reference electrode 30 and the control electrode 31 are accumulated on the side of the reference electrode 30.

Next, the controller 50 switches the output voltage of the power supply circuit 40 from −2 kV to −3 kV and at the same time switches the output voltage of the power supply circuit 41 from −3 kV to 3 kV.

A corona discharge is thus induced around the discharge electrode 20 and generated between the discharge electrode 20 and the reference electrode 30, so that the air around the discharge electrode 20 is ionized by the generation of the corona discharge to generate air ions.

Specifically, the air around the discharge electrode 20 is ionized to generate positive ions and negative ions. The negative ions are then accelerated by an electric field between the electrodes to move toward the reference electrode 30. Moreover, the air around the discharge electrode 20 and the reference electrode 30 is entrained as the negative ions move toward the reference electrode 30, whereby an ion wind is generated.

The potentials of the control electrode 31 and the reference electrode 30 now equal 3 kV and 0 V, respectively, so that the negative ions are accelerated in the process of moving toward the control electrode 31 after passing through the reference electrode 30 to generate a larger ion wind. After passing through the control electrode 31, the ion wind is blown out from an injection nozzle 12.

Figure 9:
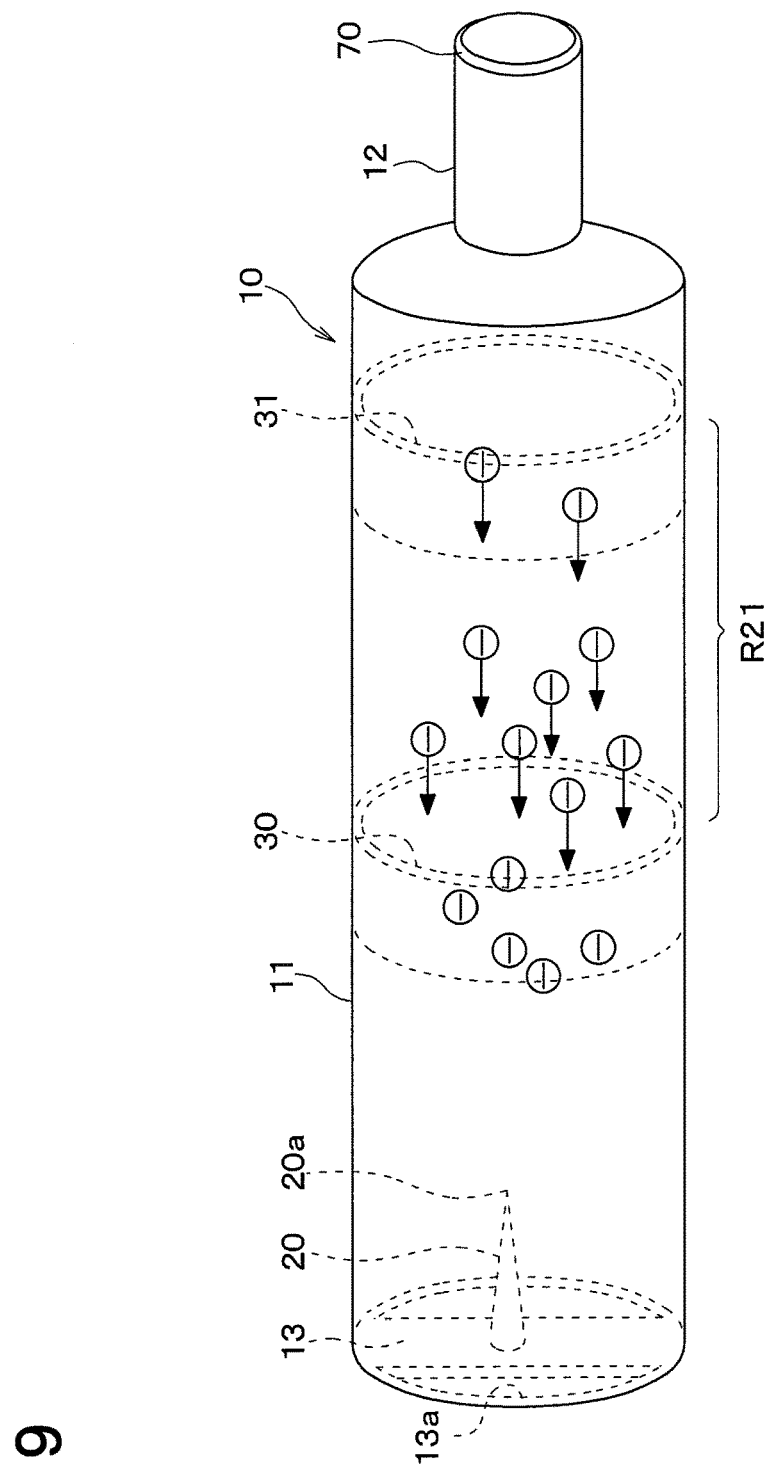
FIG. 9 is a diagram for illustrating generation of an ion wind in the jet generator according to the third embodiment.

Before controlling the output voltage of the power supply circuit 41 so as to accelerate the negative ions generated by the corona discharge toward the injection nozzle 12, the controller 50 of the present embodiment controls the output voltage of the power supply circuit 41 so as to move the negative ions between the reference electrode 30 and the control electrode 31 toward the reference electrode 30 as illustrated in range R21 of FIG. 9.

The negative ions are thus moved to be pushed back from between the reference electrode 30 and the control electrode 31 toward the reference electrode 30 and accumulated on the side of the reference electrode. These negative ions are accelerated in the process of moving toward the control electrode 31 when the output voltage of the power supply circuit 41 is controlled so as to accelerate the negative ions generated by the corona discharge toward the injection nozzle 12. As a result, a larger ion wind is generated to be blown out as a jet from the injection nozzle 12. That is, the jet generator can inject the jet from the injection nozzle 12 at a higher speed than the jet generator of the second embodiment. The amount of the negative ions to be injected from the injection nozzle 12 to the outside of the case 10 can be increased as well.

The present embodiment can also obtain the effect similar to that of the first embodiment by the configuration common to that of the first embodiment.

Fourth Embodiment

Figure 10:
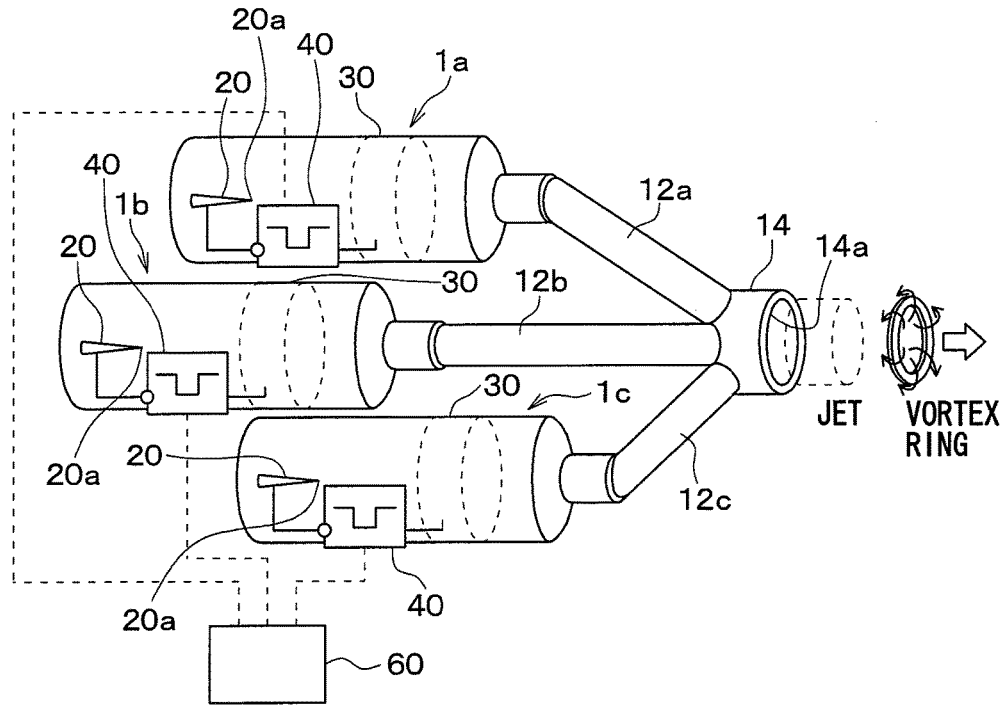
FIG. 10 is a diagram illustrating a configuration of a jet generating system according to a fourth embodiment.

FIG. 10 illustrates a configuration of a jet generating system according to a fourth embodiment. The jet generating system of the present embodiment includes jet generators $1a$ to $1c$, guide paths $12a$ to $12c$, a confluence part 14, and a timing adjustment unit 60.

The jet generators $1a$ to $1c$ each inject an ion wind generated by a corona discharge as a jet, and have the same configuration as the jet flow generator of the first embodiment.

The guide path $12a$ is provided between the jet generator $1a$ and the confluence part 14. The guide path $12a$ is an air passage that guides a jet of air injected from the jet generator $1a$ to the confluence part 14.

The guide path $12b$ is provided between the jet generator $1b$ and the confluence part 14. The guide path $12b$ is an air passage that guides a jet of air injected from the jet generator $1b$ to the confluence part 14.

The guide path $12c$ is provided between the jet generator $1c$ and the confluence part 14. The guide path $12c$ is an air passage that guides a jet of air injected from the jet generator $1c$ to the confluence part 14.

The guide paths $12a$ to $12c$ have different lengths in the present embodiment. Specifically, the guide path $12b$ is the longest, the guide path $12a$ is shorter than the guide path $12b$, and the guide path $12c$ is shorter than the guide path $12a$.

The confluence part 14 has an injection nozzle $14a$. The confluence part 14 merges a jet flowing in from the jet generator $1a$ via the guide path $12a$, a jet flowing in from the jet generator $1b$ via the guide path $12b$, and a jet flowing in from the jet generator $1c$ via the guide path $12c$, thereby allowing the jet to be injected from the injection nozzle $14a$.

The timing adjustment unit 60 is configured as a computer including a CPU, a RAM, a ROM, an I/O, and the like, and the CPU executes various types of processing in accordance with a program stored in the ROM. The RAM and the ROM are both non-transitory tangible storage medium.

The timing adjustment unit 60 is connected to a controller 50 in each of the jet generators $1a$ to $1c$ via a communication line.

When the guide paths $12a$ to $12c$ have different lengths as in the present embodiment, the ion winds generated by the corona discharge in the jet generators $1a$ to $1c$ do not reach the confluence part 14 simultaneously so that the jet does not have constant intensity and that generation of a vortex ring is inhibited.

In the present jet generating system, the timing adjustment unit 60 adjusts the timing of switching an output voltage of a power supply circuit 40 of each of the jet generators $1a$ to $1c$. Specifically, the timing adjustment unit 60 adjusts the timing of switching the output voltage of each power supply circuit 40 in accordance with the length of each of the guide paths $12a$ to $12c$ such that the jets injected from the injection nozzles of the jet generators $1a$ to $1c$ reach the confluence part 14 at the same time.

Figure 11:
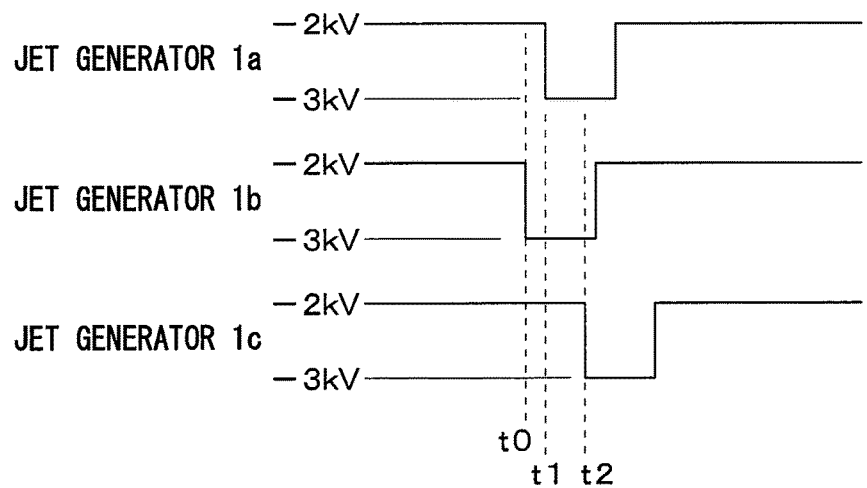
FIG. 11 is a diagram illustrating an output waveform of a power supply circuit of a jet generator according to the fourth embodiment.

FIG. 11 illustrates an output waveform of the output voltage of the power supply circuit 40 in each of the jet generators $1a$ to $1c$ included in the present jet generating system. As illustrated in FIG. 11, the timing adjustment unit 60 controls the power supply circuits 40 of the jet generators $1a$ to $1c$ such that, among the jet generators $1a$ to $1c$ and the corresponding guide paths $12a$ to $12c$, the output voltage of the power supply circuit 40 of the jet generator corresponding to the longer guide path falls faster.

That is, the output voltage of the power supply circuit 40 of the jet generator $1a$ is switched from −2 kV to −3 kV at time t0, and then the output voltage of the power supply circuit 40 of the jet generator $1b$ is switched from −2 kV to −3 kV at time t1. Then at time t2, the output voltage of the power supply circuit 40 of the jet generator $1c$ is switched from −2 kV to −3 kV.

The above configuration allows the ion winds generated by the corona discharge in the jet generators $1a$ to $1c$ to reach the confluence part 14 simultaneously to thus be able to have increased intensity of the jet and successively generate the vortex ring.

The present embodiment can obtain the effect similar to that of the first embodiment by the configuration common to that of the first embodiment.

Fifth Embodiment

A fifth embodiment will now be described with reference to FIGS. 15, 16, and 17. A jet generator according to the present embodiment is different from the jet generator of the first embodiment in that the configurations of a support 13 and a discharge electrode 20 are modified and that a state responsive member 15 and a mount 16 are added. The rest of the configuration of the jet generator of the present embodiment is the same as that of the first embodiment. Hereinafter, the jet generator of the present embodiment will be described focusing on a part different from that of the first embodiment.

Figure 15:
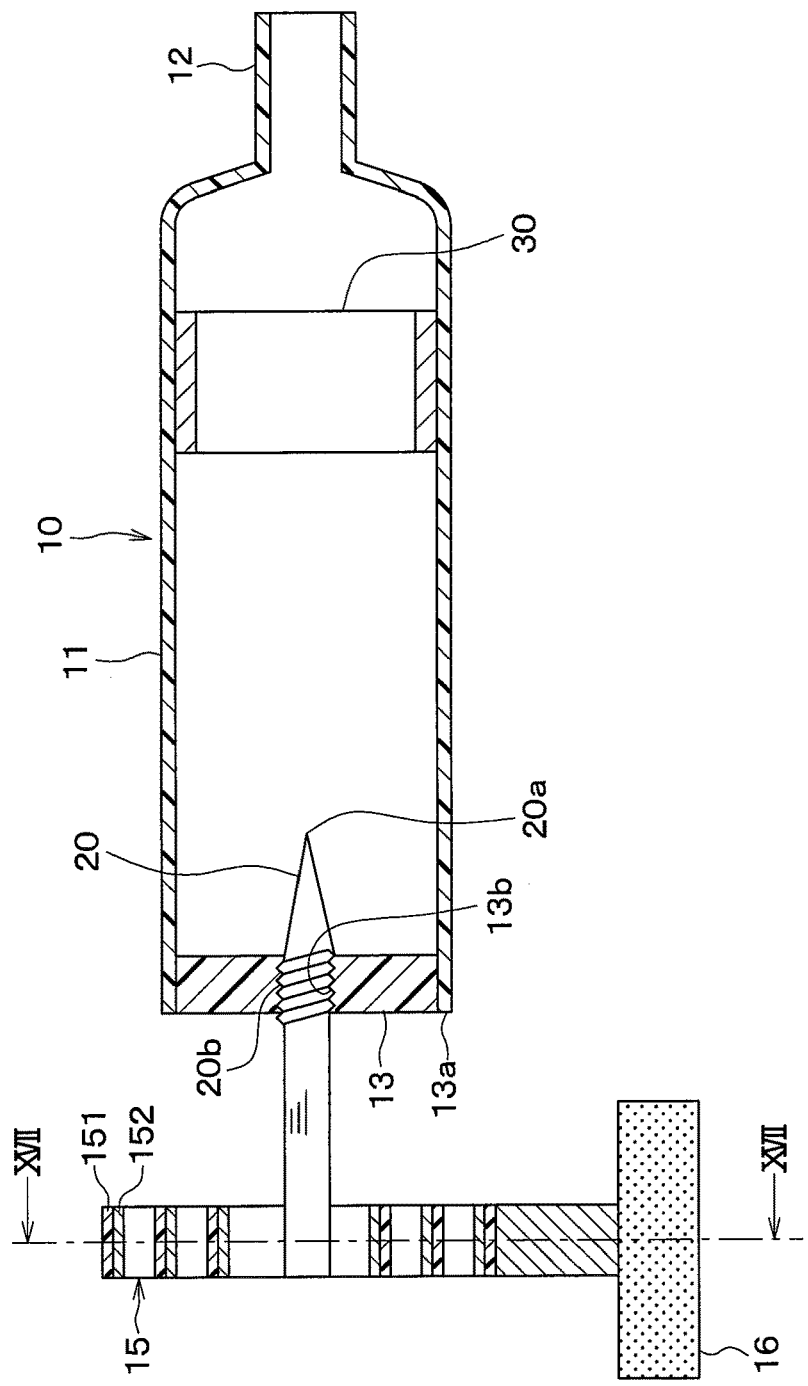
FIG. 15 is a cross-sectional view illustrating a configuration of a jet generator according to a fifth embodiment.

FIG. 15 is a cross-sectional view of the jet generator cut along a plane including a central axis of a case 10. FIG. 16 is a perspective view illustrating only the support 13, the discharge electrode 20, the state responsive member 15, and the mount 16 of the jet generator. FIG. 17 is a cross-sectional view taken along line XVII-XVII of FIG. 15.

Figure 16:
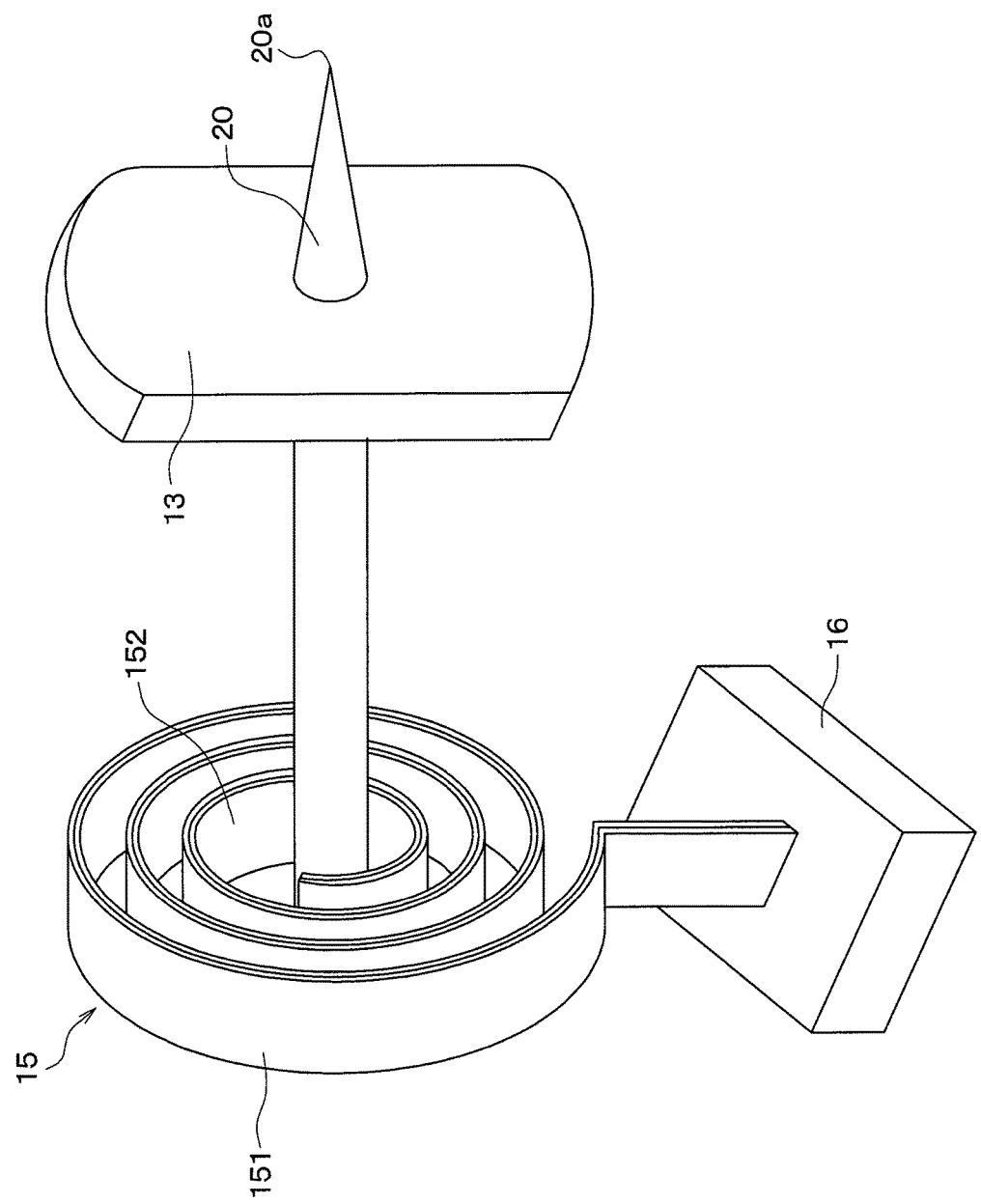
FIG. 16 is a perspective view of a discharge electrode and its surrounding members.

As illustrated in FIGS. 15 and 16, a screw hole 13b is formed in and around a part of the support 13 overlapping the central axis of the case 10. The discharge electrode 20 has a cylindrical part made of a conductive metal and having a cylindrical shape, and a conical part made of a conductive metal and having a conical shape. A base on one side of the cylindrical part is in contact with a base of the conical part. The cylindrical part is formed integrally with the conical part. A male screw 20b corresponding to the screw hole 13b is formed on a part of an outer periphery (that is, a side surface) of the cylindrical part.

The screw hole 13b and the male screw 20b are screwed together as illustrated in FIG. 15. The discharge electrode 20 passes through the support 13 via the screw hole 13b. The conical part is thus entirely disposed inside the case 10, while the cylindrical part is partly disposed outside the case 10. When turning about a central axis of the discharge electrode 20, the discharge electrode 20 moves in the direction of the central axis of the case 10 by the action of the screw hole 13b and the male screw 20b. In the present embodiment, the central axis of the discharge electrode 20 coincides with the central axis of the case 10.

Figure 17:
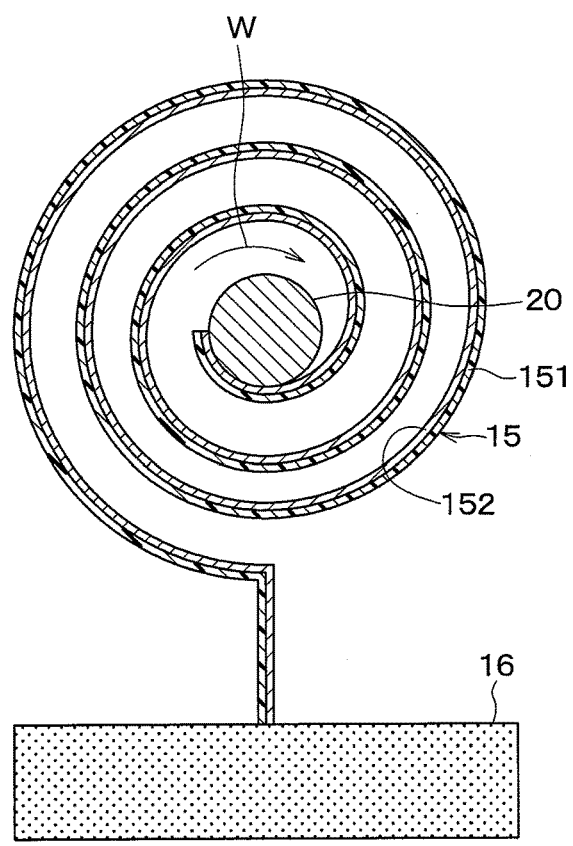
FIG. 17 is a cross-sectional view taken along line XVII-XVII of FIG. 15.

As illustrated in FIGS. 15, 16, and 17, a side surface of an end of the cylindrical part of the discharge electrode 20 on the side away from the discharge electrode 20 is fixed to the state responsive member 15.

The shape of the state responsive member 15 changes in accordance with humidity of a gas around the state responsive member 15. The gas around the state responsive member 15 is sucked into the case 10 and blown out from an injection nozzle 12 as an ion wind when the jet generator is in operation. The gas around the state responsive member 15 is naturally the gas around the jet generator as well.

The state responsive member 15 has a first member 151 and a second member 152. The first member 151 is a member mainly containing a moisture sensitive material. Resin or paper may be used as the moisture sensitive material. The first member 151 has an elongated plate shape.

The second member 152 is a member mainly containing a moisture insensitive material. A member made of metal (such as brass or 42 alloy) may be used as the moisture insensitive material. The second member 152 has an elongated plate shape substantially identical to that of the first member 151.

The first member 151 and the second member 152 are thus elongated by different amounts in the longitudinal direction in response to the same amount of change in humidity. Specifically, when the humidity of the gas (i.e., the air) around the state responsive member 15 increases from first humidity to second humidity, the amount of elongation of the first member 151 in the longitudinal direction is larger than the amount of elongation of the second member 152 in the longitudinal direction. When the humidity of the gas around the state responsive member 15 decreases from the second humidity to the first humidity, the amount of contraction of the first member 151 in the longitudinal direction is larger than the amount of contraction of the second member 152 in the longitudinal direction.

As illustrated in FIGS. 15, 16, and 17, a surface of the first member 151 facing the second member 152 in the thickness direction is stuck to a surface of the second member 152 facing the first member 151 in the thickness direction. The first member 151 and the second member 152 are thus stacked in the thickness direction of both members.

As illustrated in FIGS. 15, 16, and 17, the first member 151 and the second member 152 both extend in a spiral shape along the longitudinal direction of both members. The first member 151 is disposed on the outer peripheral side of the spiral shape, and the second member 152 is disposed on the inner peripheral side of the spiral shape.

Outer ends of the spirals of the first member 151 and the second member 152 are fixed to the mount 16. Moreover, as illustrated in FIG. 17, a surface of the end of the spiral of the second member 152 on the side of the center of the spiral is fixed to the side surface of the cylindrical part of the discharge electrode 20, the surface of the end of the spiral being opposite to the surface stuck to the first member 151.

The mount 16 is fixed to a member (such as a ceiling, a meter, a steering wheel, or a headrest in a vehicle interior) to which the jet generator is mounted.

Hereinafter, the operation of the jet generator configured as described above will be described focusing on a part different from that of the first embodiment.

In the jet generator of the present embodiment, a voltage identical to that in the first embodiment is also applied between the discharge electrode 20 and a reference electrode 30 at the same timing as that in the first embodiment.

A high electric field is generated in the vicinity of a tip 20a of the discharge electrode 20 during a period (that is, a period of 0.2 seconds in FIG. 2) in which a high voltage of −3 kV is output from a power supply circuit 40, whereby a corona discharge occurs to generate an ion wind as in the first embodiment.

A spark discharge occurs between the discharge electrode 20 and the reference electrode 30 when the high electric field caused by the high voltage applied to generate the corona discharge is too high. The occurrence of the spark discharge causes an undesirable situation such as a defect in the electrode or generation of ozone in the discharge electrode 20 and the reference electrode 30.

The inventor notes that the occurrence of the spark discharge is influenced by not only the applied voltage but also the distance between the electrodes and the state of gas (such as the air) around the discharge electrode 20 and the reference electrode 30. Particularly, when the humidity of the gas around the electrodes is high, dielectric breakdown and thus the spark discharge are more likely to occur even with the same distance between the electrodes and the same voltage applied between the electrodes.

According to a prior art described in JP 2010-010138 A, a control circuit prevents a spark discharge by instantaneously reducing the voltage of the discharge electrode when a sensor detects a spike of current immediately before the occurrence of the spark discharge.

Such conventional art, however, requires addition of a complicated circuit for detecting the spike and a circuit for instantaneously reducing the voltage.

On the other hand, in the jet generator of the present embodiment, the state responsive member 15 includes the first member 151 and the second member 152 which are elongated by different amounts in the longitudinal direction in response to the same amount of change in humidity. As a result, the shape of the state responsive member 15 changes in accordance with the humidity of gas around the state responsive member 15.

Specifically, when the humidity of the gas around the state responsive member 15 increases, the first member 151 absorbs moisture and swells to be elongated in the longitudinal direction. The second member 152 does not swell as much as the first member 151 at this time and is thus elongated in the longitudinal direction by the amount smaller than the elongation of the first member 151.

As a result, the spiral shape formed by the state responsive member 15 is elongated more on the outer peripheral side than on the inner peripheral side. The state responsive member 15 is then deformed in a direction in which the number of turns of the spiral shape increases. As a result, the discharge electrode 20 turns about the central axis thereof with respect to the support 13 in the direction indicated by arrow W in FIG. 17.

While turning in the above manner, the discharge electrode 20 moves along the direction of the central axis of the case 10 away from the reference electrode 30 by the action of the screw hole 13b and the male screw 20b. As a result, the shortest distance between the tip 20a and the reference electrode 30 increases.

The distance between the discharge electrode 20 and the reference electrode 30 increases as described above when the humidity around the discharge electrode 20 and the reference electrode 30 increases. Therefore, a possibility of the occurrence of the spark discharge is low even when the voltage identical to that applied before the increase in humidity is applied between the discharge electrode 20 and the reference electrode 30.

When the humidity of the gas around the state responsive member 15 decreases, the first member 151 releases moisture and contracts to be shortened in the longitudinal direction. The second member 152 does not contract as much as the first member 151 at this time and is thus shortened in the longitudinal direction by the amount smaller than the shortening of the first member 151.

As a result, the spiral shape formed by the state responsive member 15 is shortened more on the outer peripheral side than on the inner peripheral side. The state responsive member 15 is then deformed in a direction in which the number of turns of the spiral shape decreases. As a result, the discharge electrode 20 turns about the central axis thereof with respect to the support 13 in a direction opposite to the direction indicated by arrow W in FIG. 17.

While turning in the above manner, the discharge electrode 20 moves along the direction of the central axis of the case 10 closer to the reference electrode 30 by the action of the screw hole 13b and the male screw 20b. As a result, the shortest distance between the tip 20a and the reference electrode 30 decreases.

The distance between the discharge electrode 20 and the reference electrode 30 decreases as described above when the humidity around the discharge electrode 20 and the reference electrode 30 decreases. Therefore, even when the voltage identical to that applied before the decrease in humidity is applied between the discharge electrode 20 and the reference electrode 30, an electric field high enough to cause a sufficient corona discharge can be generated between the discharge electrode 20 and the reference electrode 30.

The lengths and shapes of the first member 151 and the second member 152 can be adjusted as appropriate such that the application of voltage of −3 kV in the jet generator causes an appropriate corona discharge without causing a spark discharge at many humidity levels.

Sixth Embodiment

A sixth embodiment will now be described with reference to FIG. 18. A jet generator according to the present embodiment is different from the jet generator of the fifth embodiment in that the state responsive member 15 is replaced by a state responsive member 17 and a spring member 17x is added. The rest of the configuration is the same as that of the fifth embodiment. The spring member 17x corresponds to an elastic member.

Figure 18:
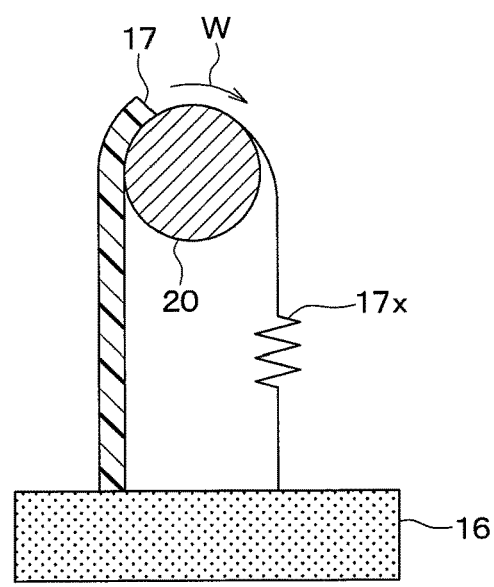
FIG. 18 is a cross-sectional view illustrating a configuration of a jet generator according to a sixth embodiment.

FIG. 18 is a cross-sectional view of the jet generator of the present embodiment taken along a section perpendicular to a central axis of a case 10 and including a mount 16, the state responsive member 17, the spring member 17x, and a discharge electrode 20. Note that the illustration of the spring member 17x is simplified.

The state responsive member 17 is a swelling member mainly containing a moisture sensitive material similar to that of the fifth embodiment. One longitudinal end of the state responsive member 17 is fixed to the mount 16. Another longitudinal end of the state responsive member 17 is fixed to a side surface of a cylindrical part of the discharge electrode 20 so as to be wound therearound clockwise in FIG. 18.

The spring member 17x is an elastic member having a lower elastic modulus than the state responsive member 17. One longitudinal end of the spring member 17x is fixed to the mount 16. Another longitudinal end of the spring member 17x is fixed to the side surface of the cylindrical part of the discharge electrode 20 so as to be wound therearound counterclockwise in FIG. 18.

The spring member 17x is always stretched beyond its natural length. The spring member 17x thus constantly exerts a force on the discharge electrode 20 in the direction that causes the discharge electrode 20 to turn clockwise in FIG. 18. Therefore, the spring member 17x biases the state responsive member 17 via the discharge electrode 20 in the direction that causes the longitudinal length of the state responsive member 17 to increase. Such configuration allows the discharge electrode 20 to be moved appropriately while preventing slack in the state responsive member 17 at the time of elongation.

The state responsive member 17 is elongated in the longitudinal direction when humidity of gas (or the air) around the state responsive member 17 increases from first humidity to second humidity. The state responsive member 17 is contracted in the longitudinal direction when the humidity of the gas around the state responsive member 17 decreases from the second humidity to the first humidity.

Hereinafter, the operation of the jet generator configured as described above will be described focusing on a part different from that of the fifth embodiment. In the jet generator of the present embodiment, a voltage identical to that in the fifth embodiment is also applied between the discharge electrode 20 and a reference electrode 30 at the same timing as that in the fifth embodiment. As a result, a corona discharge occurs to generate an ion wind.

In the present embodiment, an increase in humidity of the gas around the state responsive member 17 causes the state responsive member 17 to absorb moisture and swell to be elongated in the longitudinal direction. As a result, the discharge electrode 20 turns about the central axis thereof with respect to a support 13 in a direction indicated by arrow W in FIG. 18 by the biasing force from the spring member 17*x*.

While turning in the above manner, the discharge electrode 20 moves along the direction of the central axis of the case 10 away from the reference electrode 30 by the action of a screw hole 13*b* and a male screw 20*b*. As a result, the shortest distance between the tip 20*a* and the reference electrode 30 increases.

The distance between the discharge electrode 20 and the reference electrode 30 increases as described above when the humidity around the discharge electrode 20 and the reference electrode 30 increases. Therefore, a possibility of the occurrence of a spark discharge is low even when the voltage identical to that applied before the increase in humidity is applied between the discharge electrode 20 and the reference electrode 30.

A decrease in humidity of the gas around the state responsive member 17 causes the state responsive member 17 to release moisture and contract to be shortened in the longitudinal direction. As a result, the discharge electrode 20 is pulled by the state responsive member 17. The discharge electrode 20 thus turns about the central axis thereof with respect to the support 13 in a direction opposite to the direction indicated by arrow W in FIG. 18 against the biasing force from the spring member 17*x*.

While turning in the above manner, the discharge electrode 20 moves along the direction of the central axis of the case 10 closer to the reference electrode 30 by the action of the screw hole 13*b* and the male screw 20*b*. As a result, the shortest distance between the tip 20*a* and the reference electrode 30 decreases.

The distance between the discharge electrode 20 and the reference electrode 30 decreases as described above when the humidity around the discharge electrode 20 and the reference electrode 30 decreases. Therefore, even when the voltage identical to that applied before the decrease in humidity is applied between the discharge electrode 20 and the reference electrode 30, an electric field high enough to cause a sufficient corona discharge can be generated between the discharge electrode 20 and the reference electrode 30.

The length of the state responsive member 17 and the elastic modulus of the spring member 17*x* can be adjusted as appropriate such that the application of voltage of −3 kV in the jet generator causes an appropriate corona discharge without causing a spark discharge at many humidity levels.

Seventh Embodiment

A seventh embodiment will now be described with reference to FIG. 19. A jet generator according to the present embodiment is different from the jet generator of the sixth embodiment in that the state responsive member 17 and the spring member 17*x* are replaced by a state responsive member 18 and a spring member 18*x*, respectively. The jet generator of the present embodiment includes a discharge electrode 20 and a mount 16 that are connected to each other differently from those of the jet generator of the sixth embodiment. The jet generator of the present embodiment does not include a screw hole 13*b* and a male screw 20*b* included in the jet generator of the sixth embodiment. The rest of the configuration is the same as that of the sixth embodiment. The spring member 18*x* corresponds to an elastic member.

Figure 19:
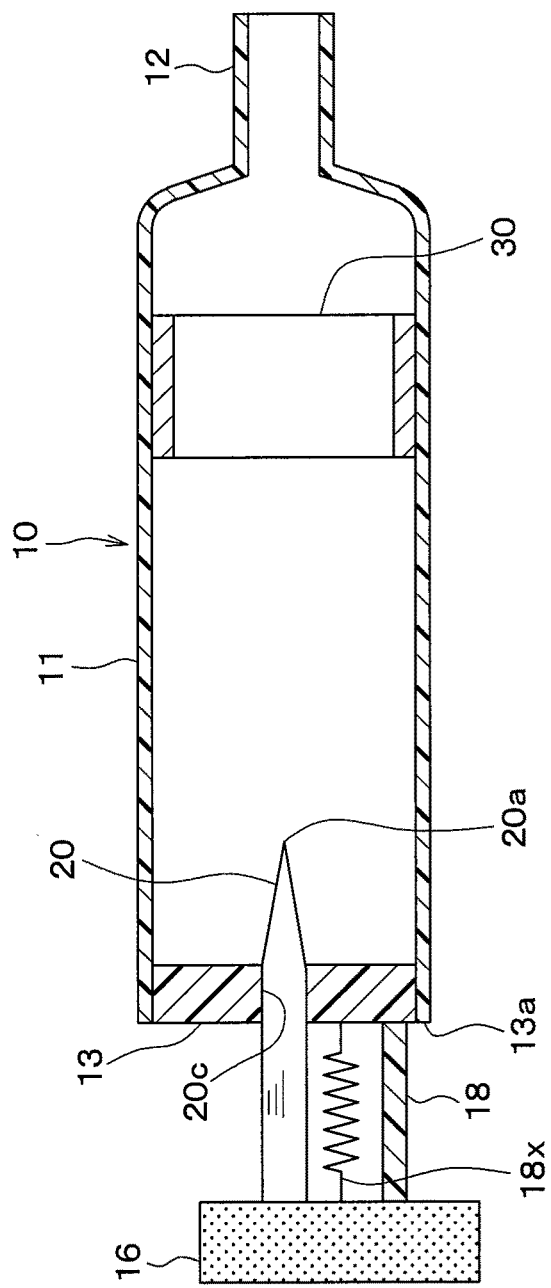
FIG. 19 is a cross-sectional view illustrating a configuration of a jet generator according to a seventh embodiment.

FIG. 19 is a cross-sectional view of the jet generator of the present embodiment taken along a section including a central axis of a case 10 as well as the mount 16, the state responsive member 18, the spring member 18*x*, and the discharge electrode 20. Note that the illustration of the spring member 18*x* is simplified.

The state responsive member 18 is a swelling member mainly containing a moisture sensitive material similar to that of the sixth embodiment. One longitudinal end of the state responsive member 18 is fixed to the mount 16. Another longitudinal end of the state responsive member 18 is fixed to a support 13. From the one longitudinal end to the other longitudinal end, the state responsive member 18 extends in parallel with a central axis of the discharge electrode 20.

The spring member 18*x* is an elastic member having a lower elastic modulus than the state responsive member 18. One longitudinal end of the spring member 18*x* is fixed to the mount 16. Another longitudinal end of the spring member 18*x* is fixed to the support 13. From the one longitudinal end to the other longitudinal end, the spring member 18*x* extends in parallel with the central axis of the discharge electrode 20.

The spring member 18*x* is always contracted from its natural length. The spring member 18*x* thus constantly exerts a force on the mount 16 in a direction that causes the mount 16 to move away from the support 13. Therefore, the spring member 18*x* biases the state responsive member 18 via the mount 16 in the direction that causes the longitudinal length of the state responsive member 18 to increase. Such configuration allows the discharge electrode 20 to be moved appropriately while preventing slack in the state responsive member 18 at the time of elongation.

The state responsive member 18 is elongated in the longitudinal direction when humidity of gas (or the air) around the state responsive member 18 increases from first humidity to second humidity. The state responsive member 18 is contracted in the longitudinal direction when the humidity of the gas around the state responsive member 18 decreases from the second humidity to the first humidity.

Between two bases of a cylindrical part of the discharge electrode 20, the base away from a conical part of the electrode is fixed to the mount 16. Unlike the fifth and sixth embodiments, the mount 16 of the present embodiment is not fixed but movable.

While the screw hole 13*b* and the male screw 20*b* of the sixth embodiment are eliminated in the present embodiment, a through hole 20*c* is formed in a part of the support 13 overlapping the central axis of the case 10. The discharge electrode 20 passes through the support 13 through the through hole 20*c*. The cylindrical part of the discharge electrode 20 is supported by the support 13 so as to be slidable with respect to the support 13 in the through hole 20*c*.

Hereinafter, the operation of the jet generator configured as described above will be described focusing on a part different from that of the sixth embodiment. In the jet generator of the present embodiment, a voltage identical to that in the sixth embodiment is also applied between the discharge electrode 20 and a reference electrode 30 at the same timing as that in the sixth embodiment. As a result, a corona discharge occurs to generate an ion wind.

An increase in humidity of the gas around the state responsive member 18 causes the state responsive member 18 to absorb moisture and swell to be elongated in the longitudinal direction. The spring member 18*x* is thus made capable of elongation. As a result, the mount 16 is pushed by the spring member 18*x* to move away from the support 13. The discharge electrode 20 also moves with the mount 16. Therefore, the discharge electrode 20 moves along the central axis of the case 10 in a direction away from the reference electrode 30, whereby the shortest distance between a tip 20a and the reference electrode 30 increases.

The distance between the discharge electrode 20 and the reference electrode 30 increases as described above when the humidity around the discharge electrode 20 and the reference electrode 30 increases. Therefore, a possibility of the occurrence of a spark discharge is low even when the voltage identical to that applied before the increase in humidity is applied between the discharge electrode 20 and the reference electrode 30.

A decrease in humidity of the gas around the state responsive member 18 causes the state responsive member 18 to release moisture and contract to be shortened in the longitudinal direction. As a result, the mount 16 is pulled by the state responsive member 18 to move in a direction closer to the support 13 against the biasing force of the spring member 18x. The discharge electrode 20 also moves with the mount 16. Therefore, the discharge electrode 20 moves along the central axis of the case 10 in a direction closer to the reference electrode 30, whereby the shortest distance between the tip 20a and the reference electrode 30 decreases.

The distance between the discharge electrode 20 and the reference electrode 30 decreases as described above when the humidity around the discharge electrode 20 and the reference electrode 30 decreases. Therefore, even when the voltage identical to that applied before the decrease in humidity is applied between the discharge electrode 20 and the reference electrode 30, an electric field high enough to cause a sufficient corona discharge can be generated between the discharge electrode 20 and the reference electrode 30.

The length of the state responsive member 18 and the elastic modulus of the spring member 18x can be adjusted as appropriate such that the application of voltage of −3 kV in the jet generator causes an appropriate corona discharge without causing a spark discharge at many humidity levels.

Eighth Embodiment

An eighth embodiment will now be described with reference to FIGS. 20 and 21. A jet generator according to the present embodiment is different from the jet generator of the seventh embodiment in that the state responsive member 18 and the spring member 18x are replaced by a state responsive member 19 and a spring member 19x, respectively. The jet generator of the present embodiment is configured such that a mount 16 and each of a discharge electrode 20 and a support 13 are connected differently from those of the jet generator of the seventh embodiment. The jet generator of the present embodiment is further configured such that a body 11 and the support 13 are connected to each other differently from those of the jet generator of the seventh embodiment. Moreover, in the jet generator of the present embodiment, the reference electrode 30 is replaced by a reference electrode 30a. The rest of the configuration is the same as that of the seventh embodiment. The spring member 19x corresponds to an elastic member.

Figure 20:
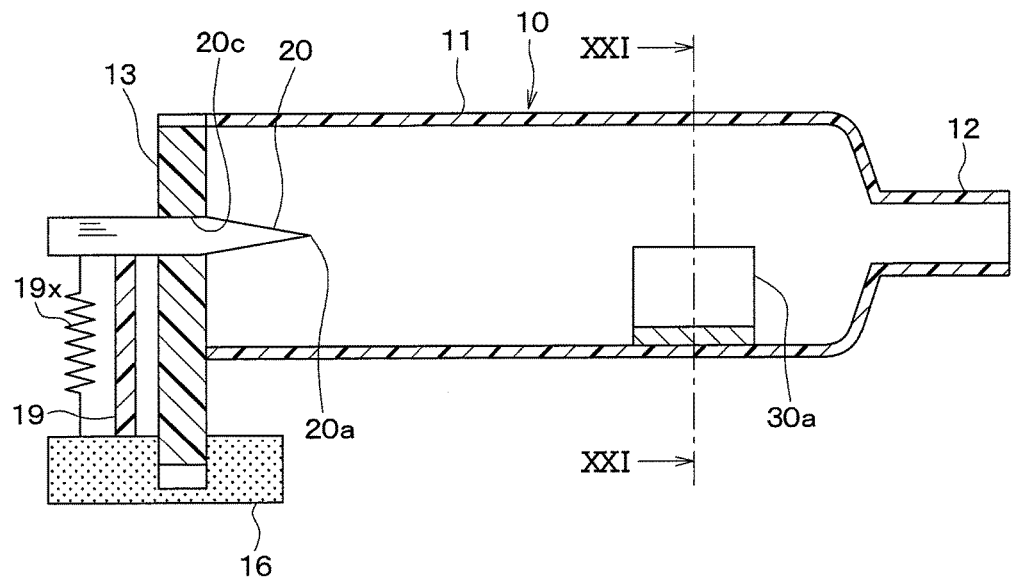
FIG. 20 is a cross-sectional view illustrating a configuration of a jet generator according to an eighth embodiment.

FIG. 20 is a cross-sectional view of the jet generator of the present embodiment taken along a section including a central axis of a case 10 as well as the mount 16, the state responsive member 19, the spring member 19x, and the discharge electrode 20. Note that the illustration of the spring member 19x is simplified.

The state responsive member 19 is a swelling member mainly containing a moisture sensitive material similar to that of the seventh embodiment. One longitudinal end of the state responsive member 19 is fixed to the mount 16. Another longitudinal end of the state responsive member 19 is fixed to a side surface of a cylindrical part of the discharge electrode 20. From the one longitudinal end to the other longitudinal end, the state responsive member 19 extends perpendicular to a central axis of the discharge electrode 20.

The spring member 19x is an elastic member having a lower elastic modulus than the state responsive member 19. One longitudinal end of the spring member 19x is fixed to the mount 16. Another longitudinal end of the spring member 19x is fixed to the side surface of the cylindrical part of the discharge electrode 20. From the one longitudinal end to the other longitudinal end, the spring member 19x extends perpendicular to the central axis of the discharge electrode 20.

The spring member 19x is always contracted from its natural length. The spring member 19x thus constantly exerts a force on the discharge electrode 20 in the direction that causes the discharge electrode 20 to move away from the mount 16. Therefore, the spring member 19x biases the state responsive member 19 via the discharge electrode 20 in the direction that causes the longitudinal length of the state responsive member 19 to increase. Such configuration allows the discharge electrode 20 to be moved appropriately while preventing slack in the state responsive member 19 at the time of elongation. Unlike the seventh embodiment, the mount 16 of the present embodiment is fixed to another part in a vehicle.

The state responsive member 19 is elongated in the longitudinal direction when humidity of gas (or the air) around the state responsive member 19 increases from first humidity to second humidity. The state responsive member 19 is contracted in the longitudinal direction when the humidity of the gas around the state responsive member 19 decreases from the second humidity to the first humidity.

The discharge electrode 20 is fixed to the support 13. The support 13 is not fixed to the body 11 of the case 10 but is slidable with respect to the case 10 in a direction orthogonal to the central axis of the case 10. The support 13 is also fitted into a groove formed in the mount 16. Such configuration allows the support 13 to be held by the mount 16 slidably with respect to the mount 16.

Figure 21:
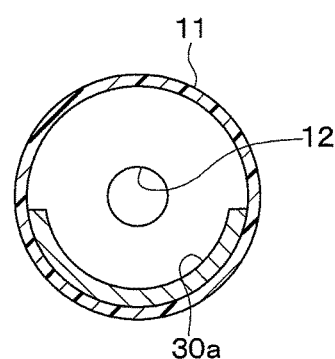
FIG. 21 is a cross-sectional view taken along line XXI-XXI of FIG. 20.

As illustrated in FIGS. 20 and 21, the reference electrode 30a has the same shape as one of halves of a member having a bottomless hollow cylindrical shape that is cut in two along a section including a central axis of the cylindrical shape. In other words, the reference electrode 30a is a plate member curved so as to draw a semicircle around the central axis of the case 10 along the inner peripheral surface of the body 11. The reference electrode 30a is made of a conductive metal, and is connected to a positive terminal of a power supply circuit 40 and to a ground terminal GND as in the first embodiment. Inside the case 10, the reference electrode 30a covers a lower half of the inner peripheral surface of the body 11 but does not cover an upper half of the inner peripheral surface of the body 11, as illustrated in FIGS. 20 and 21. The reference electrode 30a is thus disposed to be non-axisymmetric with respect to the central axis of the discharge electrode 20.

Hereinafter, the operation of the jet generator configured as described above will be described focusing on a part different from that of the seventh embodiment. In the jet generator of the present embodiment, a voltage identical to that in the seventh embodiment is also applied between the discharge electrode 20 and the reference electrode 30 at the same timing as that in the seventh embodiment. As a result, a corona discharge occurs to generate an ion wind.

An increase in humidity of the gas around the state responsive member 19 causes the state responsive member 19 to absorb moisture and swell to be elongated in the longitudinal direction. The spring member 19x is thus made capable of elongation. As a result, the discharge electrode 20 and the support 13 are pushed by the spring member 19x to move away from the mount 16. That is, the discharge electrode 20 and the support 13 move in a direction orthogonal to the central axis of the case 10 and upward in FIG. 20. At this time, the support 13 slides without changing its posture while being supported by the mount 16 and the body 11. The discharge electrode 20 thus moves away from the reference electrode 30a positioned at the bottom of the case 10, whereby the shortest distance between a tip 20a and the reference electrode 30a increases.

The distance between the discharge electrode 20 and the reference electrode 30a increases as described above when the humidity around the discharge electrode 20 and the reference electrode 30a increases. Therefore, a possibility of the occurrence of a spark discharge is low even when the voltage identical to that applied before the increase in humidity is applied between the discharge electrode 20 and the reference electrode 30a.

A decrease in humidity of the gas around the state responsive member 19 causes the state responsive member 19 to release moisture and contract to be shortened in the longitudinal direction. As a result, the discharge electrode 20 and the support 13 are pulled by the state responsive member 19 to move toward the mount 16 against the biasing force of the spring member 19x. That is, the discharge electrode 20 and the support 13 move in a direction orthogonal to the central axis of the case 10 and downward in FIG. 20. At this time, the support 13 slides without changing its posture while being supported by the mount 16 and the body 11. The discharge electrode 20 thus moves toward the reference electrode 30a positioned at the bottom of the case 10, whereby the shortest distance between the tip 20a and the reference electrode 30a decreases.

The distance between the discharge electrode 20 and the reference electrode 30a decreases as described above when the humidity around the discharge electrode 20 and the reference electrode 30a decreases. Therefore, even when the voltage identical to that applied before the decrease in humidity is applied between the discharge electrode 20 and the reference electrode 30a, an electric field high enough to cause a sufficient corona discharge can be generated between the discharge electrode 20 and the reference electrode 30a.

The length of the state responsive member 19 and the elastic modulus of the spring member 19x can be adjusted as appropriate such that the application of voltage of −3 kV in the jet generator causes an appropriate corona discharge without causing a spark discharge at many humidity levels.

Ninth Embodiment

A ninth embodiment will now be described with reference to FIG. 22. A jet generator according to the present embodiment is different from the jet generator of the seventh embodiment in that the state responsive member 18 and the spring member 18x are replaced by a state responsive member 22 and a spring member 22x, respectively. The jet generator of the present embodiment is configured such that a shaft member 21 and an additional holding member 161 are added to the configuration of the jet generator of the seventh embodiment. The jet generator of the present embodiment further includes a discharge electrode 20 and a mount 16 that are connected to each other differently from those of the jet generator of the seventh embodiment. Moreover, in the jet generator of the present embodiment, the reference electrode 30 is replaced by a reference electrode 30a. The rest of the configuration is the same as that of the seventh embodiment. The spring member 22x corresponds to an elastic member.

Figure 22:
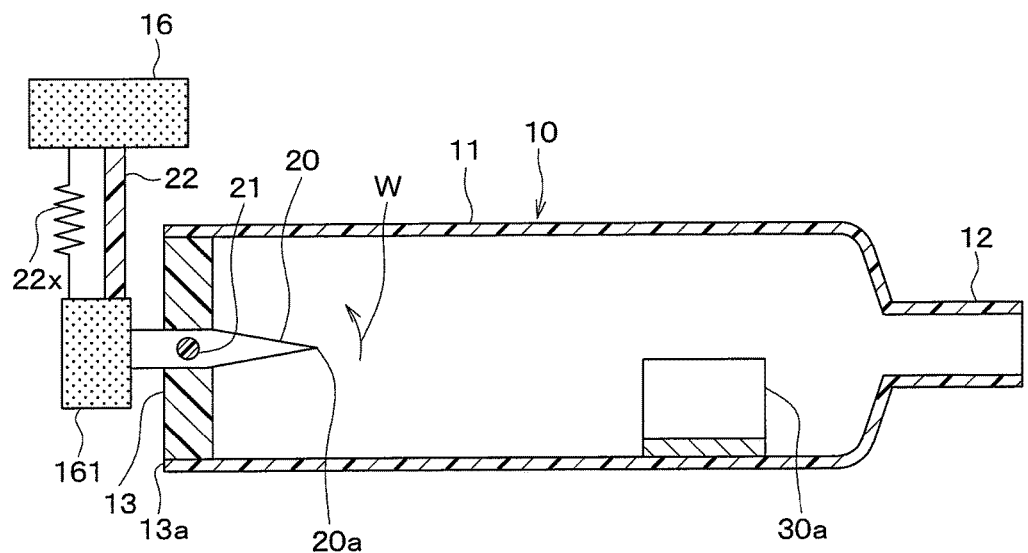
FIG. 22 is a cross-sectional view illustrating a configuration of a jet generator according to a ninth embodiment.

FIG. 22 is a cross-sectional view of the jet generator of the present embodiment taken along a section including a central axis of a case 10 as well as the mount 16, the state responsive member 22, the spring member 22x, the discharge electrode 20, and the shaft member 21. Note that the illustration of the spring member 22x is simplified.

The shaft member 21 passes through a cylindrical part of the discharge electrode 20 orthogonally to a central axis of the discharge electrode 20 and in a direction orthogonal to the face of FIG. 22. Both ends of the shaft member 21 are rotatably supported by a support member (not shown) in a vehicle.

The shaft member 21 is also fixed to the discharge electrode 20. The discharge electrode 20 is fixed to the support 13. Between two bases of the cylindrical part of the discharge electrode 20, the base away from a tip 20a is fixed to the additional holding member 161. The support 13 is not fixed to a body 11. Accordingly, the shaft member 21, the discharge electrode 20, the support 13, and the additional holding member 161 can rotate together about the shaft member 21 as the axis of rotation.

The state responsive member 22 is a swelling member mainly containing a moisture sensitive material similar to that of the seventh embodiment. An upper longitudinal end of the state responsive member 22 is fixed to the mount 16. A lower longitudinal end of the state responsive member 22 is fixed to the additional holding member 161. From one longitudinal end (or the upper end) to another longitudinal end (or the lower end), the state responsive member 22 extends perpendicular to the central axis of the discharge electrode 20.

The spring member 22x is an elastic member having a lower elastic modulus than the state responsive member 22. An upper longitudinal end of the spring member 22x is fixed to the mount 16. A lower longitudinal end of the spring member 22x is fixed to the additional holding member 161. From one longitudinal end (or the upper end) to another longitudinal end (or the lower end), the spring member 22x extends perpendicular to the central axis of the discharge electrode 20.

The spring member 22x is always contracted from its natural length. The spring member 22x thus constantly exerts a force on the additional holding member 161 in the direction that causes the additional holding member 161 to move away from the mount 16. Therefore, the spring member 22x biases the state responsive member 22 via the additional holding member 161 in the direction that causes the longitudinal length of the state responsive member 22 to increase. Such configuration allows the discharge electrode 20 to be moved appropriately while preventing slack in the state responsive member 22 at the time of elongation. Unlike the seventh embodiment, the mount 16 of the present embodiment is fixed to another part in the vehicle.

The state responsive member 22 is elongated in the longitudinal direction when humidity of gas (or the air) around the state responsive member 22 increases from first humidity to second humidity. The state responsive member 22 is contracted in the longitudinal direction when the humidity of the gas around the state responsive member 22 decreases from the second humidity to the first humidity.

The material, shape, and arrangement of the reference electrode 30a are the same as those of the reference electrode 30a of the eighth embodiment. Specifically, the reference electrode 30a has the same shape as one of halves of a member having a bottomless hollow cylindrical shape that is cut in two along a section including a central axis of the cylindrical shape. The reference electrode 30a is made of a conductive metal, and is connected to a positive terminal of a power supply circuit 40 and to a ground terminal GND as in the first embodiment. The reference electrode 30a inside the case 10 covers a lower half of the inner peripheral surface of the body 11 but does not cover an upper half of the inner peripheral surface of the body 11. The reference electrode 30a is thus disposed to be non-axisymmetric with respect to the central axis of the discharge electrode 20.

Hereinafter, the operation of the jet generator configured as described above will be described focusing on a part different from that of the seventh embodiment. In the jet generator of the present embodiment, a voltage identical to that in the seventh embodiment is also applied between the discharge electrode 20 and the reference electrode 30 at the same timing as that in the seventh embodiment. As a result, a corona discharge occurs to generate an ion wind.

An increase in humidity of the gas around the state responsive member 22 causes the state responsive member 22 to absorb moisture and swell to be elongated in the longitudinal direction. The spring member 22x is thus made capable of elongation. As a result, the additional holding member 161 is pushed by the spring member 22x to move away from the mount 16. That is, the additional holding member 161 moves substantially downward in FIG. 20. Accordingly, the additional holding member 161, the discharge electrode 20, the support 13, and the shaft member 21 turn about the shaft member 21 in a direction of arrow W (or counterclockwise in FIG. 22).

The tip 20a of the discharge electrode 20 thus moves away from the reference electrode 30a positioned at the bottom of the case 10. As a result, the shortest distance between the tip 20a and the reference electrode 30a increases.

The distance between the tip 20a and the reference electrode 30a increases as described above when the humidity around the discharge electrode 20 and the reference electrode 30a increases. Therefore, a possibility of the occurrence of a spark discharge is low even when the voltage identical to that applied before the increase in humidity is applied between the discharge electrode 20 and the reference electrode 30a.

A decrease in humidity of the gas around the state responsive member 22 causes the state responsive member 22 to release moisture and contract to be shortened in the longitudinal direction. As a result, the additional holding member 161 is pulled by the state responsive member 22 to move toward the mount 16 against the biasing force of the spring member 22x. That is, the additional holding member 161 moves substantially upward in FIG. 20. Accordingly, the additional holding member 161, the discharge electrode 20, the support 13, and the shaft member 21 turn about the shaft member 21 in a direction opposite to the direction of arrow W (or clockwise in FIG. 22).

The tip 20a of the discharge electrode 20 thus moves toward the reference electrode 30a positioned at the bottom of the case 10. As a result, the shortest distance between the tip 20a and the reference electrode 30a decreases.

The distance between the tip 20a and the reference electrode 30a decreases as described above when the humidity around the discharge electrode 20 and the reference electrode 30a decreases. Therefore, even when the voltage identical to that applied before the decrease in humidity is applied between the discharge electrode 20 and the reference electrode 30a, an electric field high enough to cause a sufficient corona discharge can be generated between the discharge electrode 20 and the reference electrode 30a.

In the present embodiment, the discharge electrode 20 turns about the shaft member 21 positioned away from the tip 20a as the shape of the state responsive member 22 changes. Therefore, a change in the position of the tip 20a in response to a change in the humidity can be easily adjusted by adjusting the distance between the shaft member 21 and the additional holding member 161. Moreover, an increase in the distance between the shaft member 21 and the additional holding member 161 can increase torque generated by the state responsive member 22 and the biasing force of the spring member 22x as appropriate.

The length of the state responsive member 22 and the elastic modulus of the spring member 22x can be adjusted as appropriate such that the application of voltage of −3 kV in the jet generator causes an appropriate corona discharge without causing a spark discharge at many humidity levels.

Tenth Embodiment

Figure 23:
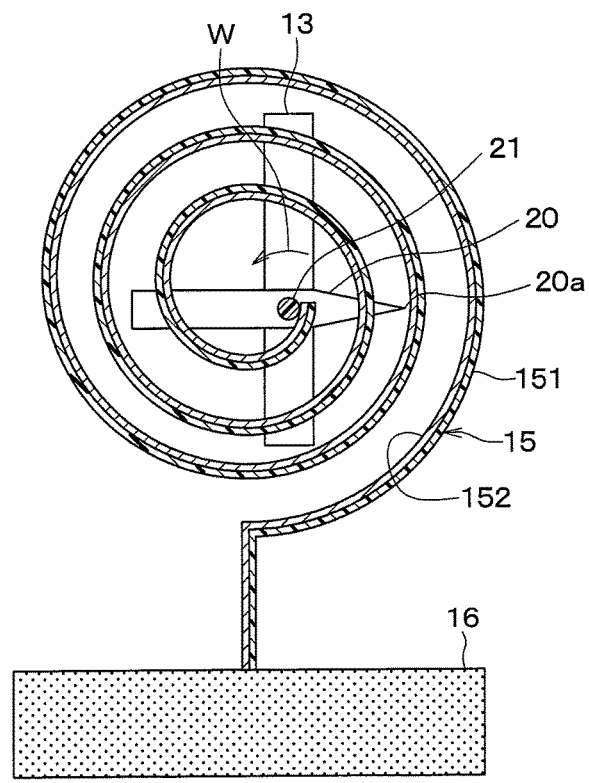
FIG. 23 is a cross-sectional view illustrating a configuration of a jet generator according to a tenth embodiment.

A tenth embodiment will now be described with reference to FIG. 23. A jet generator according to the present embodiment is configured such that the state responsive member 22, the member 18x, and the additional holding member 161 of the jet generator of the ninth embodiment are replaced by the state responsive member 15 described in the fifth embodiment. The rest of the configuration is the same as that of the ninth embodiment. FIG. 23 is a cross-sectional view of the jet generator of the present embodiment taken along a section including the state responsive member 15. Note that FIG. 23 omits illustration of a case 10 and a reference electrode 30a.

The configuration of the state responsive member 15 is as described in the fifth embodiment. Note that in the state responsive member 15 of the present embodiment, a surface of an end of a spiral of a second member 152 on a side of the center of the spiral is fixed to a side surface of a shaft member 21, the surface of the end of the spiral being opposite to a surface stuck to a first member 151.

Hereinafter, the operation of the jet generator configured as described above will be described focusing on a part different from that of the ninth embodiment. In the jet generator of the present embodiment, a voltage identical to that in the ninth embodiment is also applied between a discharge electrode 20 and the reference electrode 30a at the same timing as that in the fifth embodiment. As a result, a corona discharge occurs to generate an ion wind.

An increase in humidity of gas around the state responsive member 15 causes the first member 151 to absorb moisture and swell to be elongated in the longitudinal direction. The second member 152 does not swell as much as the first member 151 at this time and is thus elongated in the longitudinal direction by the amount smaller than the elongation of the first member 151.

As a result, the spiral shape formed by the state responsive member 15 is elongated more on the outer peripheral side than on the inner peripheral side. The state responsive member 15 is then deformed in a direction in which the number of turns of the spiral shape increases. As a result, the shaft member 21 turns about the shaft member 21 with respect to the case 10 in a direction indicated by arrow W in FIG. 23 (or counterclockwise in FIG. 23). A support 13 and the discharge electrode 20 also turn with the shaft member 21.

A tip 20a of the discharge electrode 20 thus moves away from the reference electrode 30a positioned at the bottom of the case 10. As a result, the shortest distance between the tip 20a and the reference electrode 30a increases.

The distance between the tip 20a and the reference electrode 30a increases as described above when the humidity around the discharge electrode 20 and the reference electrode 30a increases. Therefore, a possibility of the occurrence of a spark discharge is low even when the voltage identical to that applied before the increase in humidity is applied between the discharge electrode 20 and the reference electrode 30a.

A decrease in humidity of the gas around the state responsive member 15 causes the first member 151 to release moisture and contract to be shortened in the longitudinal direction. The second member 152 does not contract as much as the first member 151 at this time and is thus shortened in the longitudinal direction by the amount smaller than the shortening of the first member 151.

As a result, the spiral shape formed by the state responsive member 15 is shortened more on the outer peripheral side than on the inner peripheral side. The state responsive member 15 is then deformed in a direction in which the number of turns of the spiral shape decreases. As a result, the shaft member 21 turns about the shaft member 21 with respect to the case 10 in a direction opposite to the direction indicated by arrow W in FIG. 23 (or clockwise in FIG. 23). The support 13 and the discharge electrode 20 also turn with the shaft member 21.

The tip 20a of the discharge electrode 20 thus moves toward the reference electrode 30a positioned at the bottom of the case 10. As a result, the shortest distance between the tip 20a and the reference electrode 30a decreases.

The distance between the discharge electrode 20 and the reference electrode 30a decreases as described above when the humidity around the discharge electrode 20 and the reference electrode 30a decreases. Therefore, even when the voltage identical to that applied before the decrease in humidity is applied between the discharge electrode 20 and the reference electrode 30a, an electric field high enough to cause a sufficient corona discharge can be generated between the discharge electrode 20 and the reference electrode 30a.

The lengths and shapes of the first member 151 and the second member 152 can be adjusted as appropriate such that the application of voltage of −3 kV in the jet generator causes an appropriate corona discharge without causing a spark discharge at many humidity levels.

Eleventh Embodiment

An eleventh embodiment will now be described with reference to FIG. 24. A jet generator of the present embodiment is different from the jet generator of the first embodiment in terms of details of control performed by a controller 50. The rest of the configuration is the same as that of the first embodiment.

In the present embodiment, the controller 50 operates in two modes, a normal mode and an electrode recovery mode. In the normal mode, the controller 50 first controls a power supply circuit 40 such that a voltage of −2 kV is output from the power supply circuit 40 as illustrated in FIG. 24, as with the first embodiment. A corona discharge does not occur at this time around a discharge electrode 20. Next, the controller 50 controls the power supply circuit 40 such that a voltage of −3 kV is output from the power supply circuit 40 for a certain period of time (or 0.2 seconds). A corona discharge occurs as a result, whereby an ion wind is generated as in the first embodiment.

The jet generator generating the ion wind by the corona discharge applies a high voltage between the discharge electrode 20 and a reference electrode 30 to generate the corona discharge, thereby generating a flow of air by the movement of ions between the electrodes. At this time, a negative voltage is often set to the discharge electrode 20 with respect to the reference electrode 30 as in the present embodiment. However, a negative voltage may be set to the discharge electrode 20 with respect to the reference electrode 30 in another example.

In an apparatus generating an ion wind by a corona discharge, it is known that silicone, fluororesin, or the like floating in the air around an electrode, to which a negative voltage is applied during a corona discharge, is attracted and adsorbed to the electrode.

Accordingly, in the present embodiment, the silicone or the like is deposited over time at the tip of the discharge electrode 20 generating a corona discharge. If left as is, the deposit increases with an increase in time for which the corona discharge is generated so that the corona discharge may not be able to be generated eventually.

Conventional measures to address such issue are to be able to replace the discharge electrode 20, clean the discharge electrode 20 by making the jet generator disassemblable, and incorporate a cleaning mechanism such as a brush into the jet generator to remove the deposit. The measures are effective but have demerits in terms of convenience and cost.

Accordingly, in the electrode recovery mode, the controller 50 applies a voltage at a level capable of causing a spark discharge between the discharge electrode 20 and the reference electrode 30 for a short time, enough to remove the deposit by a discharge impact, a spark, or the like. As a result, the tip of the discharge electrode 20 is exposed again to be able to generate a corona discharge.

Figure 24:
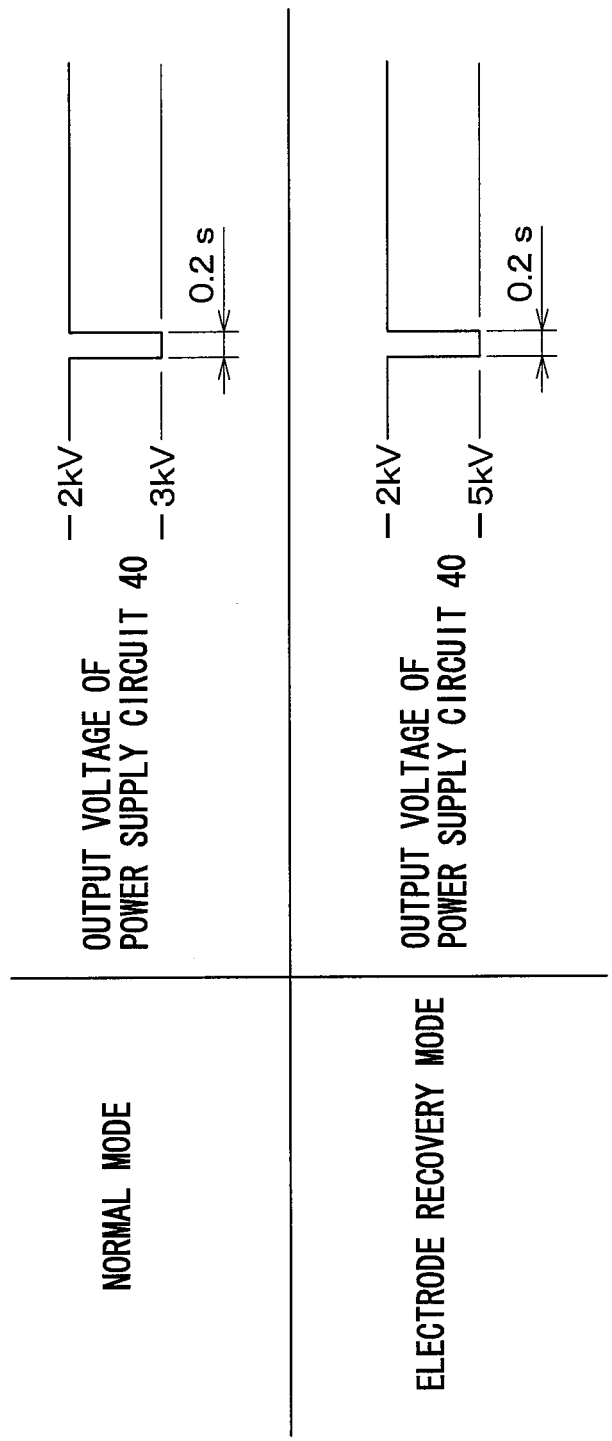
FIG. 24 is a diagram illustrating an output waveform of a power supply circuit of a jet generator according to an eleventh embodiment.

Specifically, in the electrode recovery mode, the controller 50 first controls the power supply circuit 40 such that a voltage of −2 kV is output from the power supply circuit 40 as illustrated in FIG. 24. As a result, the potential of a discharge electrode 20 equals −2 kV, and the potential of the reference electrode 30 equals 0 V. A corona discharge or spark discharge does not occur around the discharge electrode 20 when the output voltage of the power supply circuit 40 is set to −2 kV.

In the electrode recovery mode, the controller 50 then controls the power supply circuit 40 such that a voltage of −5 kV is output from the power supply circuit 40 for a certain period of time (0.2 seconds in the present embodiment), as illustrated in FIG. 24. As a result, the potential of the discharge electrode 20 equals −5 kV, and the potential of the reference electrode 30 equals 0 V. With the voltage of −5 kV applied between the discharge electrode 20 and the reference electrode 30, a high electric field is generated in the vicinity of the tip 20a of the discharge electrode 20 to cause a spark discharge. The spark discharge removes a part or all of the deposit on the discharge electrode 20. The tip of the discharge electrode 20 is thus exposed again. As a result, a corona discharge can be generated in the normal mode.

After that, in the electrode recovery mode, the controller 50 controls the power supply circuit 40 such that a voltage of −2 kV is output from the power supply circuit 40 as illustrated in FIG. 24. As a result, the potential of a discharge electrode 20 equals −2 kV, and the potential of the reference electrode 30 equals 0 V. The spark discharge ceases, and no corona discharge occurs.

The controller 50 may switch the mode between the normal mode and the electrode recovery mode on the basis of a switching operation performed on an operation unit (not shown) by a user.

As described above, the controller 50 switches the output voltage of the power supply circuit 40 to a third voltage equal to −5 kV in order to generate the spark discharge between the discharge electrode 20 and the reference electrode 30. An absolute value of the third voltage is larger than an absolute value of −3 kV which is a second voltage. The deposit on the discharge electrode 20 can thus be removed.

JP 2007-293066 A discloses a structure in which a copying machine using a corona discharge of a discharge electrode is provided with a rotary mechanism in the discharge electrode to be rubbed against a brush. Such a configuration requires the addition of the brush and the rotary mechanism unnecessary in a discharge process, thereby causing an increase in the size of the case and an increase in cost. On the other hand, the present embodiment can remove foreign matter deposited on the discharge electrode at low cost without adding a complex component.

Twelfth Embodiment

A twelfth embodiment will now be described with reference to FIG. 25. A jet generator according to the present embodiment is different from the jet generator of the seventh embodiment in that the state responsive member 18 and the spring member 18x are removed and that the mount 16 is replaced by an actuator 23 and an output shaft 23x. The rest of the configuration is the same as that of the seventh embodiment.

Figure 25:
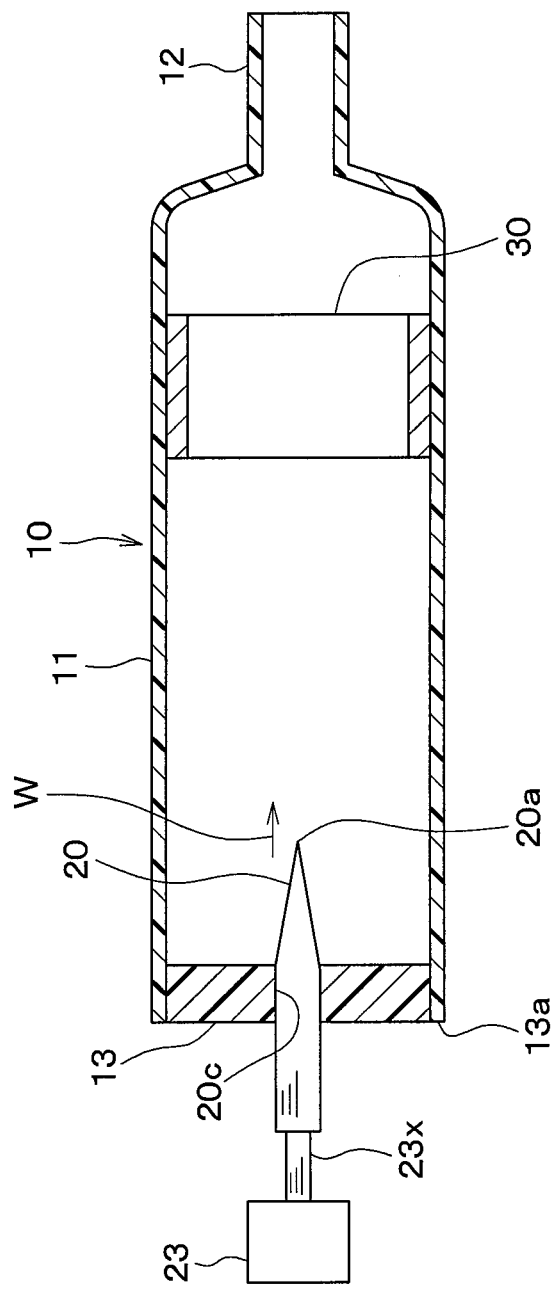
FIG. 25 is a cross-sectional view illustrating a configuration of a jet generator according to a twelfth embodiment.

FIG. 25 is a cross-sectional view of the jet generator of the present embodiment taken along a section including a central axis of a case 10 as well as the actuator 23 and the output shaft 23x. Note that the illustration of the actuator 23 is simplified.

The actuator 23 is an electric actuator brought into operation under control of a controller 50. The actuator 23 is operated to move the output shaft 23x in a direction parallel to the central axes of the discharge electrode 20 and the case 10. The actuator 23 may be a linear motor, for example.

One end of the output shaft 23x is connected to a base of a cylindrical part of the discharge electrode 20, the base being one of the bases of the cylindrical part distant from a tip 20a. Another end of the output shaft 23x is connected to the actuator 23.

Hereinafter, the operation of the jet generator configured as described above will be described. The controller 50 operates in two modes, a normal mode and an electrode recovery mode. In the normal mode, the controller 50 controls the actuator 23 to arrange the output shaft 23x and the discharge electrode 20 at predetermined normal positions. When the discharge electrode 20 is at the normal position, the shortest distance between the tip 20a and a reference electrode 30 is the same as that in the first embodiment.

Moreover, in the normal mode, the controller 50 first controls a power supply circuit 40 such that a voltage of −2 kV is output from the power supply circuit 40 as illustrated in FIG. 2, as with the first embodiment. A corona discharge does not occur at this time around the discharge electrode 20. Next, the controller 50 controls the power supply circuit 40 such that a voltage of −3 kV is output from the power supply circuit 40 for a certain period of time (or 0.2 seconds). A corona discharge occurs as a result, whereby an ion wind is generated as in the first embodiment.

In the electrode recovery mode, the controller 50 controls the actuator 23 to arrange the output shaft 23x and the discharge electrode 20 at predetermined recovery positions. As a result, the discharge electrode 20 moves in a direction indicated by arrow W along the central axis of the case 10. The shortest distance between the tip 20a and the reference electrode 30 when the discharge electrode 20 is at the recovery position is shorter than when the discharge electrode 20 is at the normal position.

Moreover, in the electrode recovery mode, the controller 50 first controls the power supply circuit 40 such that a voltage of −2 kV is output from the power supply circuit 40 as illustrated in FIG. 2, as with the first embodiment. At this time, neither corona discharge nor spark discharge occurs around the discharge electrode 20.

Next, the controller 50 controls the power supply circuit 40 such that a voltage of −3 kV is output from the power supply circuit 40 for a certain period of time (or 0.2 seconds) as illustrated in FIG. 2. A spark discharge occurs as a result. The spark discharge rather than a corona discharge occurs because the shortest distance between the tip 20a and the reference electrode 30 is shorter than that in the normal mode.

The spark discharge removes a part or all of the deposit on the discharge electrode 20. The tip of the discharge electrode 20 is thus exposed again. As a result, a corona discharge can be generated in the normal mode.

After that, in the electrode recovery mode, the controller 50 controls the power supply circuit 40 such that a voltage of −2 kV is output from the power supply circuit 40 as illustrated in FIG. 2. This causes the spark discharge to cease.

The controller 50 may switch the mode between the normal mode and the electrode recovery mode on the basis of a switching operation performed on an operation unit (not shown) by a user.

As described above, in order to generate the spark discharge between the discharge electrode 20 and the reference electrode 30, the controller 50 performs control such that the shortest distance between the tip 20a of the discharge electrode 20 and the reference electrode 30 is shorter than when a corona discharge is to be generated between the discharge electrode 20 and the reference electrode 30. The deposit on the discharge electrode 20 can thus be removed. Moreover, the spark discharge can be generated by the same voltage control as that usually generating an ion wind.

Thirteenth Embodiment

A thirteenth embodiment will now be described with reference to FIG. 26. A jet generator of the present embodiment is different from the jet generator of the eleventh embodiment in terms of processing details performed by a controller 50. The rest of the configuration is the same as that of the eleventh embodiment.

In a normal mode, the controller 50 intermittently repeats the method as illustrated in FIG. 24 at a predetermined timing to intermittently and repeatedly generate a corona discharge (such as at one second intervals).

Figure 26:
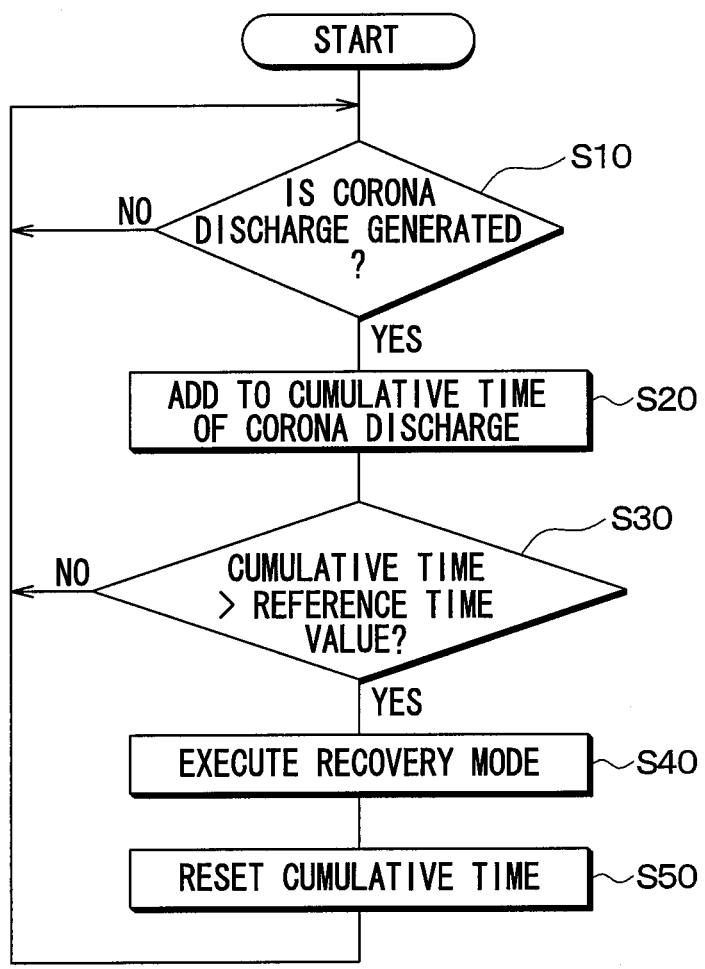
FIG. 26 is a flowchart illustrating processing performed by a controller of a jet generator according to a thirteenth embodiment.

The controller 50 also executes the processing illustrated in FIG. 26 in parallel with the above processing. In step S10 of the processing in FIG. 5, the controller 50 first waits until it is determined whether a corona discharge is generated by the jet generator. The processing proceeds to step S20 when the corona discharge is generated by the jet generator.

In step S20, the duration of the last (that is, the latest) corona discharge is added to a cumulative time of corona discharge. The cumulative time of corona discharge is a cumulative time of the corona discharge generated after the last spark discharge is generated in a recovery mode. However, if a corona discharge is never generated after the jet generator starts to be used anew, the cumulative time of corona discharge is a cumulative time of a corona discharge generated after the jet generator starts to be used anew. An initial value of the cumulative time is set to zero at the start of new use of the jet generator.

In the present embodiment, the period during which the corona discharge is generated one time is fixed to 0.2 seconds as illustrated in FIG. 24. Therefore, in step S20, the controller 50 adds 0.2 seconds to the cumulative time of corona discharge.

Then in step S30, it is determined whether a present value of the cumulative time exceeds a reference time value. The processing returns to step S10 if the present value does not exceed the reference time value. The controller 50 thus increases the cumulative time by the amount corresponding to the duration of the corona discharge every time the corona discharge occurs until the present value of the cumulative time exceeds the reference time value.

The controller 50 proceeds to step S40 if it is determined in step S30 that the present value of the cumulative time exceeds the reference time value. In step S40, the recovery mode is executed as in the eleventh embodiment. As a result, a spark discharge is generated between a discharge electrode 20 and a reference electrode 30 to remove a part or all of the deposit on the discharge electrode 20. A tip of the discharge electrode 20 is thus exposed again.

The cumulative time is reset in step S50. The cumulative time is thus restored to zero. Following step S50, the processing returns to step S10.

As described above, the controller causes the spark discharge to be generated between the discharge electrode 20 and the reference electrode 30 when the cumulative time of the occurrence of the corona discharge between the discharge electrode 20 and the reference electrode 30 exceeds the reference time value, or at the timing based on the cumulative time.

The deposit on the discharge electrode 20 increases every time the corona discharge occurs, as described above. Therefore, the operation of the controller 50 as described above allows the deposit on the discharge electrode 20 to be removed automatically at an appropriate timing.

Fourteenth Embodiment

A fourteenth embodiment will now be described with reference to FIGS. 27 and 28. A jet generator of the present embodiment is different from the jet generator of the thirteenth embodiment in that an ammeter 24 is added. The jet generator of the present embodiment is further different from the jet generator of the thirteenth embodiment in terms of processing details performed by a controller 50. The rest of the configuration is the same as that of the thirteenth embodiment.

Figure 27:
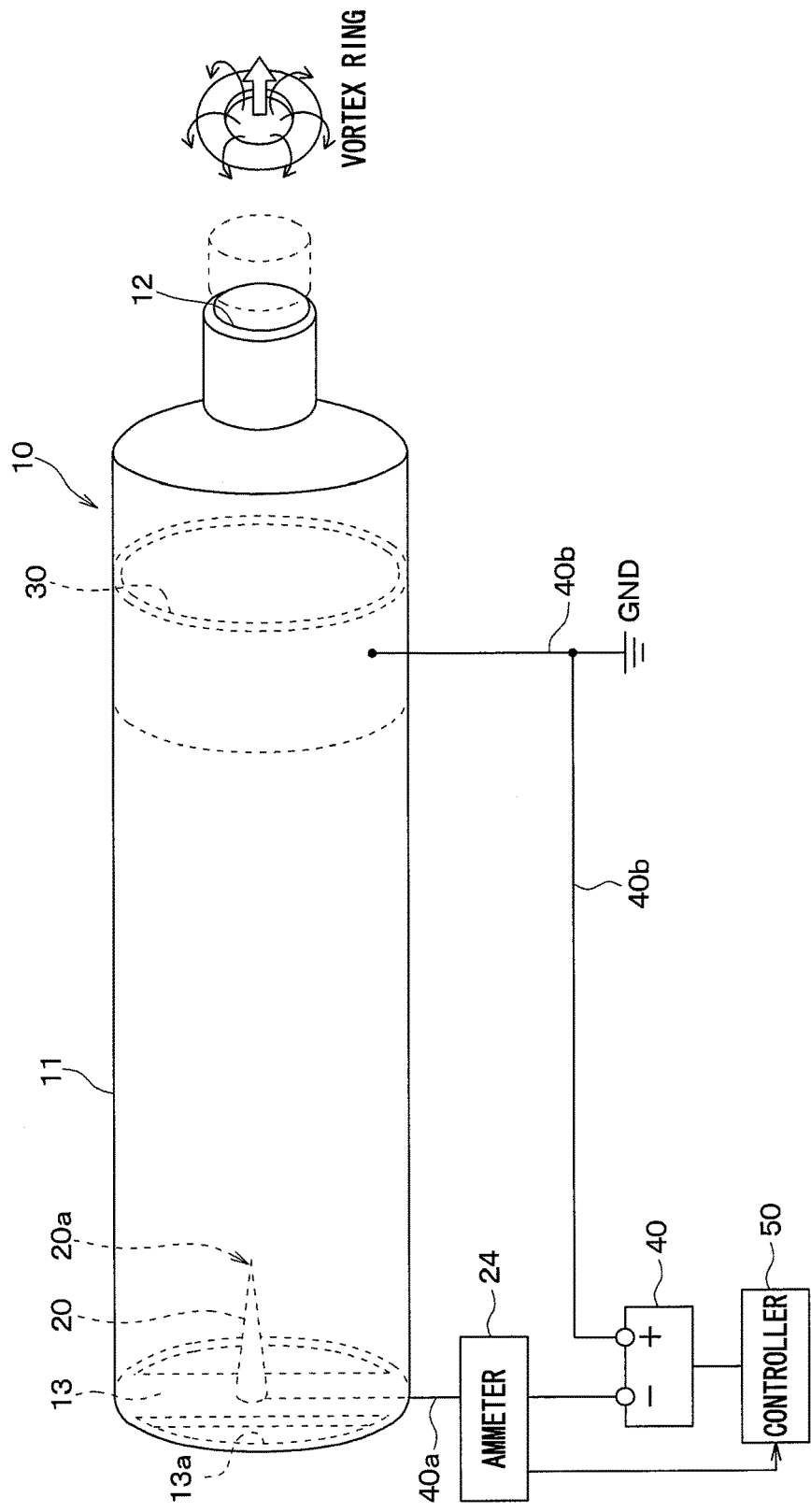
FIG. 27 is a diagram illustrating a configuration of a jet generator according to a fourteenth embodiment.
Figure 28:
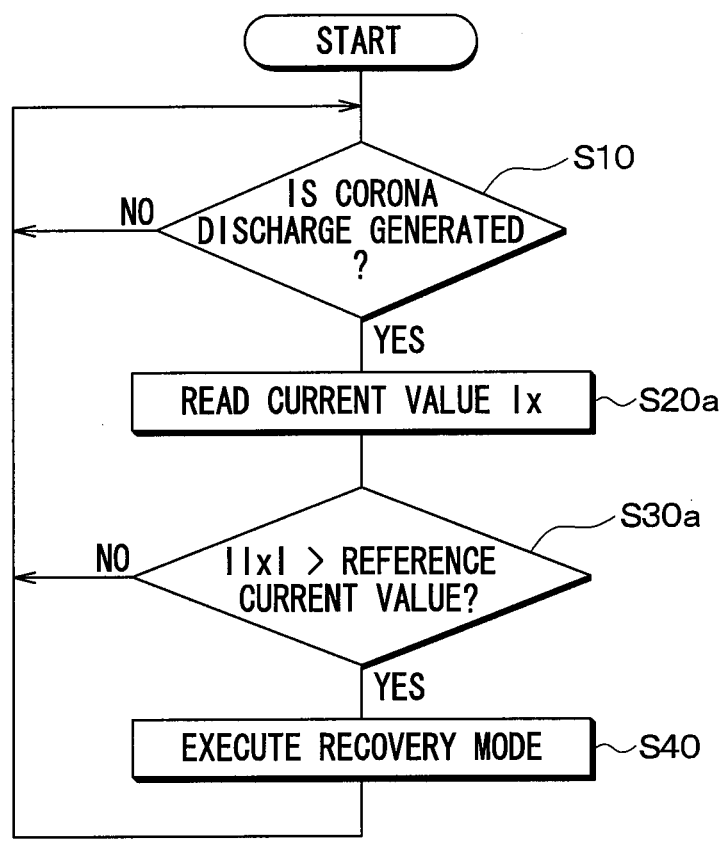
FIG. 28 is a flowchart illustrating processing performed by a controller of the fourteenth embodiment.

As illustrated in FIG. 27, the ammeter 24 is a circuit that detects a value of current flowing through wiring 40a connected to a negative terminal of a power supply circuit 40, and outputs the detected current value to the controller 50.

The operation of the jet generator will now be described. The controller 50 executes processing of FIG. 28 instead of the processing of FIG. 26 described in the thirteenth embodiment. Steps denoted by the same reference numerals in FIGS. 26 and 28 perform the same processing.

When determining in step S10 that a corona discharge is generated by the jet generator, the controller 50 proceeds to step S20a. During the corona discharge, the ammeter 24 detects a current value Ix of the current flowing through the wiring 40a and outputs the current value Ix detected to the controller 50. The controller 50 stores the current value Ix output from the ammeter 24. The current value Ix of the current flowing through the wiring 40a is the same as a current value of the current flowing through a discharge electrode 20 and a reference electrode 30.

In step S20a, the controller 50 reads the current value Ix detected by the ammeter 24 at the time of the last (that is, latest) corona discharge. The output voltage of the power supply circuit 40 is maintained at a constant voltage of −3 kV during the corona discharge, as described above.

The corona discharge is generated properly when no deposit is deposited on the discharge electrode 20. As the deposit on the discharge electrode 20 increases, however, the corona discharge is generated but an absolute value of the current flowing through the discharge electrode 20 and the reference electrode 30 decreases. The volume of an ion wind decreases as a result. The corona discharge is not generated when the deposit on the discharge electrode 20 further increases. Therefore, the controller 50 executes an electrode recovery mode at a timing when the absolute value of the current value Ix detected by the ammeter 24 during the corona discharge falls below a reference current value.

Specifically, in step S30a subsequent to step S20a, the controller 50 determines whether the absolute value of the current value Ix detected by the ammeter 24 during the corona discharge is lower than the reference current value. The processing returns to step S10 if the absolute value of the current value Ix is not lower than the reference current value. If the absolute value of the current value Ix is lower than the reference current value, the processing proceeds to step S40 to execute the recovery mode.

As a result, a spark discharge is generated between the discharge electrode 20 and the reference electrode 30 to remove a part or all of the deposit on the discharge electrode 20. A tip of the discharge electrode 20 is thus exposed again. Following step S40, the processing returns to step S10.

As described above, in generating the corona discharge between the discharge electrode 20 and the reference electrode 30, the controller 50 causes the spark discharge to be generated between the discharge electrode 20 and the reference electrode 30 at the timing based on the current flowing through the discharge electrode 20. A decrease in the current flowing through the discharge electrode 20 under a constant voltage indicates an increase in the deposit on the discharge electrode 20. Therefore, the operation of the controller 50 as described above allows the deposit on the discharge electrode 20 to be removed automatically at an appropriate timing.

Fifteenth Embodiment

A fifteenth embodiment will now be described with reference to FIGS. 29 and 30. A jet generator of the present embodiment is different from the jet generator of the thirteenth embodiment in that a voltmeter 25 is added. The jet generator of the present embodiment is further different from the jet generator of the thirteenth embodiment in terms of processing details performed by a controller 50. Unlike the first to fourteenth embodiments, a power supply circuit 40 in the jet generator of the present embodiment functions as a constant current source during a corona discharge.

Figure 29:
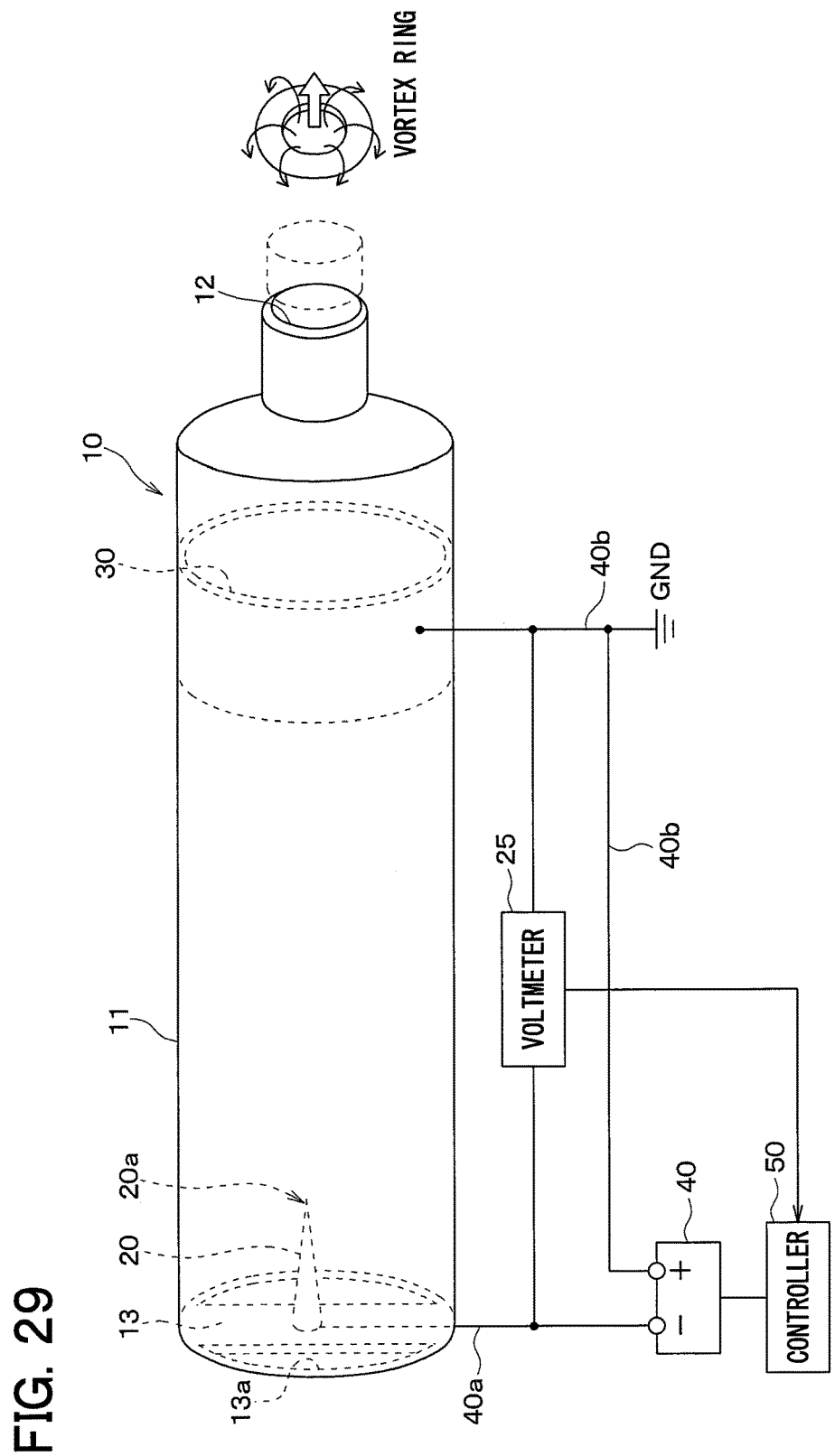
FIG. 29 is a cross-sectional view illustrating a configuration of a jet generator according to a fifteenth embodiment.
Figure 30:
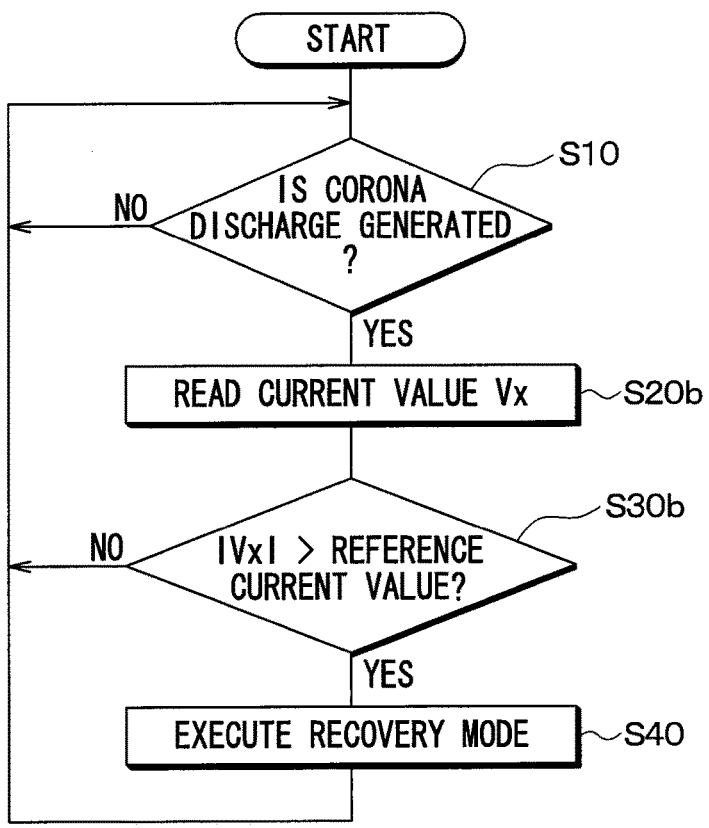
FIG. 30 is a flowchart illustrating processing performed by a controller of the fifteenth embodiment.

As illustrated in FIG. 29, the voltmeter 25 is a circuit that detects a value of voltage applied between wiring 40*b* connected to a positive terminal of the power supply circuit 40 and wiring 40*a* connected to a negative terminal of the power supply circuit 40, and outputs the detected voltage value to the controller 50.

The operation of the jet generator will now be described. The controller 50 executes processing of FIG. 30 instead of the processing of FIG. 26 described in the thirteenth embodiment. Steps denoted by the same reference numerals in FIGS. 26 and 30 perform the same processing.

When determining in step S10 that a corona discharge is generated by the jet generator, the controller 50 proceeds to step S20*b*. During the corona discharge, the voltmeter 25 detects a voltage value Vx applied between the wirings 40*a* and 40*b*, and outputs the voltage value Vx detected to the controller 50. The controller 50 stores the voltage value Vx output from the voltmeter 25.

In step S20*b*, the controller 50 reads the voltage value Vx detected by the voltmeter 25 at the time of the last (that is, the latest) corona discharge. During the corona discharge, the output voltage of the power supply circuit 40 is maintained at the voltage allowing generation of the corona discharge during which a constant current flows, as described above. The corona discharge is generated by application of the voltage of −3 kV as described above when no deposit is deposited on the discharge electrode 20.

However, an increase in the deposit on the discharge electrode 20 causes an increase in the absolute value of the voltage required to generate the corona discharge with the constant current. A further increase in the deposit on the discharge electrode 20 prevents generation of the corona discharge even when a voltage having the maximum absolute value capable by the power supply circuit 40 is applied between the discharge electrode 20 and a reference electrode 30. Therefore, the controller 50 executes an electrode recovery mode at a timing when the absolute value of the voltage value Vx detected by the voltmeter 25 during the corona discharge exceeds a reference voltage value.

Specifically, in step S30*b* subsequent to step S20*b*, the controller 50 determines whether the absolute value of the voltage value Vx detected by the voltmeter 25 during the corona discharge is higher than the reference voltage value. The processing returns to step S10 if the absolute value of the voltage value Vx is lower than or equal to the reference voltage value. If the absolute value of the voltage value Vx is higher than or equal to the reference voltage value, the processing proceeds to step S40 to execute the recovery mode.

As a result, a spark discharge is generated between the discharge electrode 20 and the reference electrode 30 to remove a part or all of the deposit on the discharge electrode 20. A tip of the discharge electrode 20 is thus exposed again. Following step S40, the processing returns to step S10.

As described above, in generating the corona discharge between the discharge electrode 20 and the reference electrode 30, the controller 50 causes the spark discharge to be generated between the discharge electrode 20 and the reference electrode 30 at the timing based on the voltage applied between the discharge electrode 20 and the reference electrode 30. An increase in the voltage applied between the discharge electrode 20 and the reference electrode 30 under a constant current indicates an increase in the deposit on the discharge electrode 20. Therefore, the operation of the controller 50 as described above allows the deposit on the discharge electrode 20 to be removed automatically at an appropriate timing.

Sixteenth Embodiment

A sixteenth embodiment will now be described with reference to FIGS. 31 and 32. A jet generator of the present embodiment is different from the jet generator of the eleventh embodiment in that the reference electrode 30 is replaced by a reference electrode 30*a*. The jet generator of the present embodiment is further configured such that an additional electrode 30*b* and a switching circuit 42 are added to the configuration of the jet generator of the eleventh embodiment. The jet generator of the present embodiment is further different from the jet generator of the eleventh embodiment in terms of the operation performed at the time of an electrode recovery mode.

Figure 31:
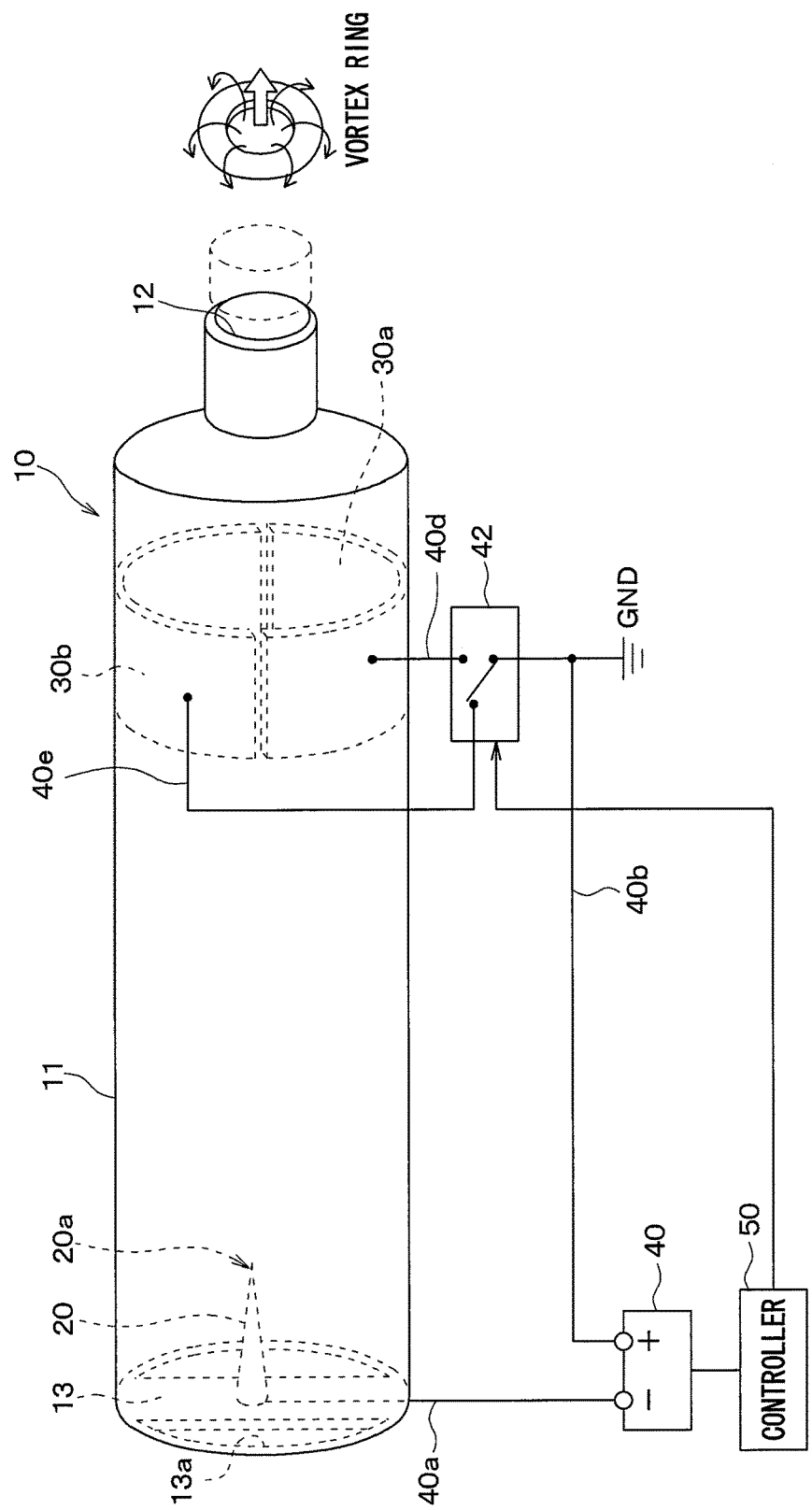
FIG. 31 is a diagram illustrating a configuration of a jet generator according to a sixteenth embodiment.

As illustrated in FIG. 31, the reference electrode 30*a* has the same shape as a lower half of a member having a bottomless hollow cylindrical shape that is cut in two along a section including a central axis of the cylindrical shape. In other words, the reference electrode 30*a* is a plate member curved so as to draw a semicircle around a central axis of a case 10 along a lower side of an inner peripheral surface of a body 11. The reference electrode 30*a* is made of a conductive metal and is connected to wiring 40*d*. The reference electrode 30*a* is thus disposed to be non-axisymmetric with respect to a central axis of a discharge electrode 20.

As illustrated in FIG. 31, the additional electrode 30*b* has the same shape as an upper half of the member having the bottomless hollow cylindrical shape that is cut in two along the section including the central axis of the cylindrical shape. In other words, the additional electrode 30*b* is a plate member curved so as to draw a semicircle around the central axis of the case 10 along an upper side of the inner peripheral surface of the body 11. The additional electrode 30*b* is made of a conductive metal and is connected to wiring 40*e*.

As described above, the reference electrode 30*a* and the additional electrode 30*b* are disposed at the positions different from each other and are not electrically continuous with each other.

The switching circuit 42 is a circuit that switchably connects wiring 40*b* to the wiring 40*d* and the wiring 40*e*, the wiring 40*b* being connected to a positive terminal of a power supply circuit 40 and a ground terminal GND. The operation of the switching circuit 42 is controlled by a controller 50.

The operation of the jet generator will now be described. In a normal mode, the controller 50 controls the switching circuit 42 such that the wiring 40*b* is connected to the wiring 40*d*. As a result, the reference electrode 30*a* is grounded while the additional electrode 30*b* is in a floating state without being grounded. In this case, an absolute value of a potential difference between the reference electrode 30*a* being grounded and the discharge electrode 20 is larger than between the additional electrode 30*b* floating and the discharge electrode 20. A corona discharge is thus more likely to occur between the discharge electrode 20 and the reference electrode 30*a* than between the discharge electrode 20 and the additional electrode 30*b*.

In the normal mode, the controller 50 first controls the power supply circuit 40 such that a voltage of −2 kV is output from the power supply circuit 40 as with the eleventh embodiment. A corona discharge does not occur at this time around the discharge electrode 20. Next, the controller 50 controls the power supply circuit 40 such that a voltage of −3 kV is output from the power supply circuit 40 for a certain period of time (or 0.2 seconds). As a result, a corona discharge occurs between the discharge electrode 20 and the reference electrode 30a, whereby an ion wind is generated as with the eleventh embodiment.

Figure 32:
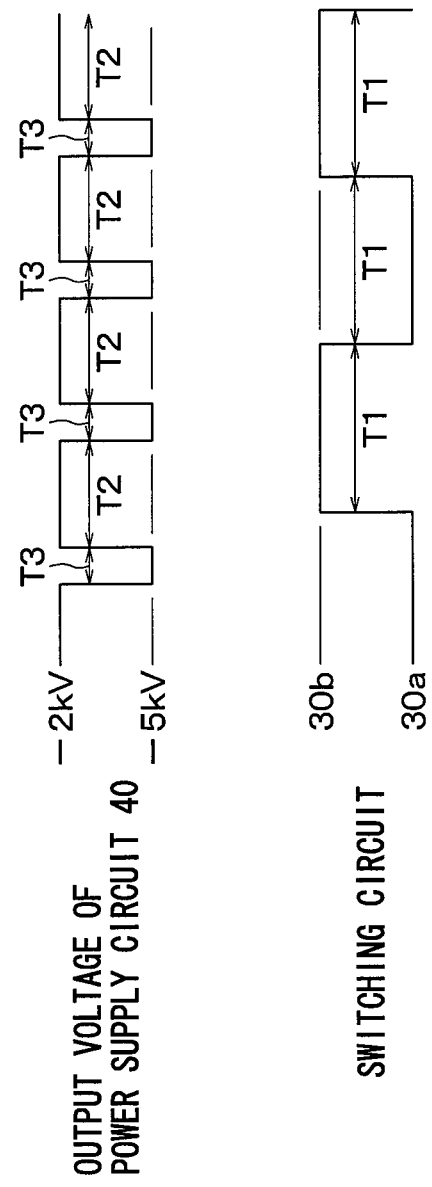
FIG. 32 is a timing diagram illustrating details of operation performed in an electrode recovery mode according to the sixteenth embodiment.

In the electrode recovery mode, as illustrated in FIG. 32, the controller 50 controls the switching circuit 42 to switch connection between a state in which the wiring 40b and the wiring 40d are connected and a state in which the wiring 40b and the wiring 40e are connected at a certain predetermined period T1.

In the state in which the wiring 40b and the wiring 40d are connected, the reference electrode 30a is grounded while the additional electrode 30b is in the floating state without being grounded. In this case, the absolute value of the potential difference between the reference electrode 30a being grounded and the discharge electrode 20 is larger than between the additional electrode 30b floating and the discharge electrode. A spark discharge is thus more likely to occur between the discharge electrode 20 and the reference electrode 30a than between the discharge electrode 20 and the additional electrode 30b.

In the state in which the wiring 40b and the wiring 40e are connected, the additional electrode 30b is grounded while the reference electrode 30a is in the floating state without being grounded. In this case, the absolute value of the potential difference between the additional electrode 30b being grounded and the discharge electrode 20 is larger than between the reference electrode 30a floating and the discharge electrode 20. A spark discharge is thus more likely to occur between the discharge electrode 20 and the additional electrode 30b than between the discharge electrode 20 and the reference electrode 30a.

Moreover, in the electrode recovery mode, the controller 50 maintains the output voltage of the power supply circuit 40 at −2 kV during period T2 and thereafter at −5 kV during period T3 of 0.2 seconds, as illustrated in FIG. 32. As a result, a spark discharge occurs at the point the output voltage of the power supply circuit 40 equals −5 kV.

Therefore, a spark discharge occurs between the discharge electrode 20 and the reference electrode 30a in one period T3, and occurs between the discharge electrode 20 and the additional electrode 30b in a subsequent period T3. A spark discharge then occurs between the discharge electrode 20 and the reference electrode 30a in a subsequent period T3, and occurs between the discharge electrode 20 and the additional electrode 30b in a subsequent period T3. That is, the spark discharge between the discharge electrode 20 and the reference electrode 30a and the spark discharge between the discharge electrode 20 and the additional electrode 30b occur alternately.

The positions of the reference electrode 30a and the additional electrode 30b are different from each other as described above. A discharge path is thus different between when the spark discharge occurs between the discharge electrode 20 and the reference electrode 30a and when the spark discharge occurs between the discharge electrode 20 and the additional electrode 30b. As a result, the deposit is removed from different positions on the discharge electrode 20 between when the spark discharge occurs between the discharge electrode 20 and the reference electrode 30a and when the spark discharge occurs between the discharge electrode 20 and the additional electrode 30b.

This reduces the possibility that only the deposit on a specific part of the discharge electrode 20 is removed while leaving the deposit on the other parts unremoved. That is, the unevenness can be reduced in terms of the position on the discharge electrode 20 from which the deposit is removed.

As described above, the controller 50 causes the spark discharge to occur between the discharge electrode 20 and the reference electrode 30a in one period and between the discharge electrode 20 and the additional electrode 30b in a period different from the one period. The controller 50 thus alternately switches the electrode to be grounded between the reference electrode 30a and the additional electrode 30b. As a result, the unevenness can be reduced in terms of the position on the discharge electrode 20 from which the deposit is removed.

Seventeenth Embodiment

A seventeenth embodiment will now be described with reference to FIGS. 33 and 34. A jet generator of the present embodiment is different from the jet generator of the twelfth embodiment in that the actuator 23 is replaced by an actuator 26, the output shaft 23x is replaced by an output shaft 26x, and the reference electrode 30 is replaced by a reference electrode 30a. Moreover, details of control performed by a controller 50 are different from those of the twelfth embodiment. The rest of the configuration is the same as that of the twelfth embodiment.

Figure 33:
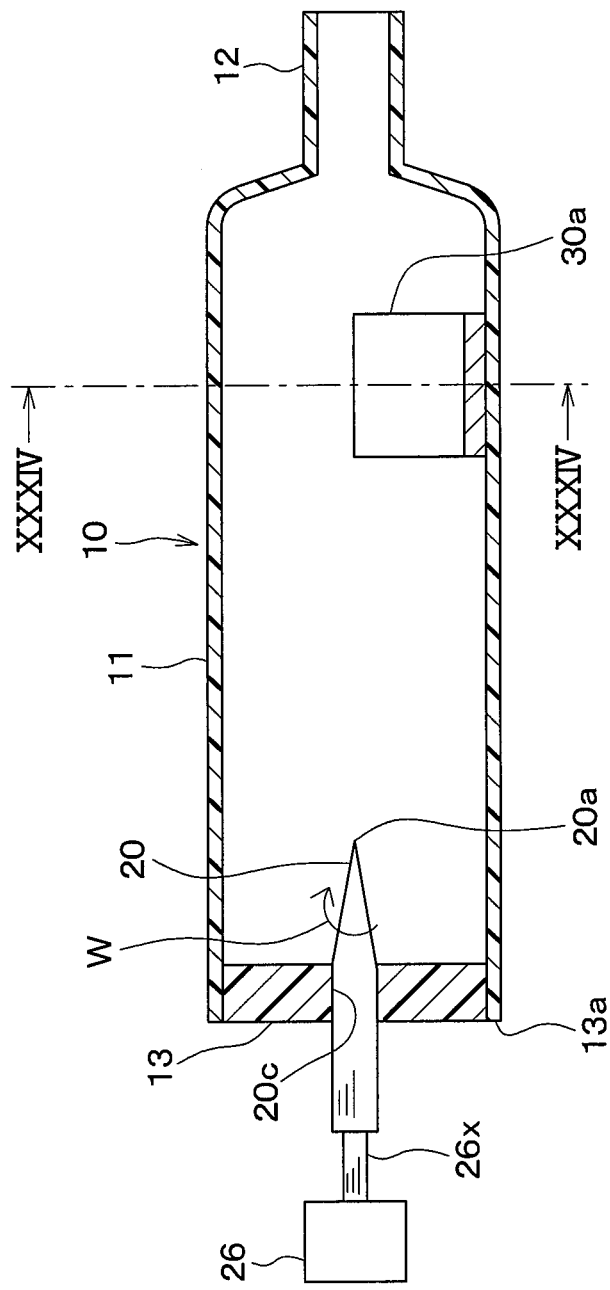
FIG. 33 is a cross-sectional view illustrating a configuration of a jet generator according to a seventeenth embodiment.

FIG. 33 is a cross-sectional view of the jet generator of the present embodiment taken along a section including a central axis of a case 10 as well as the actuator 26 and the output shaft 26x. Note that the illustration of the actuator 26 is simplified.

The actuator 26 is an electric actuator brought into operation under control of the controller 50. The actuator 26 is operated to rotate the output shaft 26x about the central axes of a discharge electrode 20 and the case 10 in a direction indicated by arrow W. The actuator 26 may be an electric motor, for example.

One end of the output shaft 26x is connected to a base of a cylindrical part of the discharge electrode 20, the base being one of the bases of the cylindrical part distant from a tip 20a. Another end of the output shaft 26x is connected to the actuator 26. Accordingly, when the output shaft 26x rotates about the central axes of the discharge electrode 20 and the case 10 in the direction indicated by arrow W, the discharge electrode 20 also rotates with the output shaft 26x. The discharge electrode 20 slides with respect to a support 13 at this time.

Figure 34:
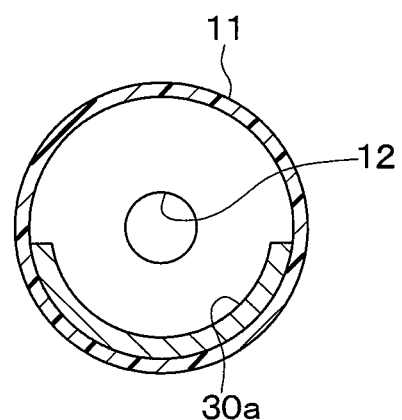
FIG. 34 is a cross-sectional view taken along line XXXIV-XXXIV of FIG. 33.

As illustrated in FIGS. 33 and 34, the reference electrode 30a has the same shape as a lower half of a member having a bottomless hollow cylindrical shape that is cut in two along a section including a central axis of the cylindrical shape. In other words, the reference electrode 30a is a plate member curved so as to draw a semicircle around the central axis of the case 10 along the inner peripheral surface of a body 11. The reference electrode 30a is made of a conductive metal, and is connected to a positive terminal of a power supply circuit 40 and to a ground terminal GND. Inside the case 10, the reference electrode 30a covers a lower half of the inner peripheral surface of the body 11 but does not cover an upper half of the inner peripheral surface of the body 11, as illustrated in FIGS. 33 and 34. The reference electrode 30a is thus disposed to be non-axisymmetric with respect to a central axis of a discharge electrode 20.

Hereinafter, the operation of the jet generator configured as described above will be described. The controller 50 operates in two modes, a normal mode and an electrode recovery mode. In the normal mode, the controller 50 first controls the power supply circuit 40 such that a voltage of −2 kV is output from the power supply circuit 40 as with the eleventh embodiment illustrated in FIG. 24, without bringing the actuator 26 into operation. A corona discharge does not occur at this time around the discharge electrode 20. Next, the controller 50 controls the power supply circuit 40 such that a voltage of −3 kV is output from the power supply circuit 40 for a certain period of time (or 0.2 seconds). A corona discharge occurs as a result, whereby an ion wind is generated as in the eleventh embodiment.

In the electrode recovery mode, the controller 50 controls the actuator 26 to rotate the output shaft 26x and the discharge electrode 20 about the central axes of the discharge electrode 20 and the case 10 in the direction indicated by arrow W.

In the electrode recovery mode, the controller 50 then intermittently generates a spark discharge between the discharge electrode 20 and the reference electrode 30a while rotating the discharge electrode 20 as described above. Specifically, the controller 50 repeats a plurality of times the processing of controlling the power supply circuit 40 such that a voltage of −2 kV is output from the power supply circuit 40 and thereafter controlling the power supply circuit 40 such that a voltage of −5 kV is output from the power supply circuit 40.

As a result, the relative position of the reference electrode 30a with respect to the discharge electrode 20 changes from a specific round of the spark discharge to a subsequent round of the spark discharge. Specifically, the posture of the discharge electrode 20 in the specific round of the spark discharge and the posture of the discharge electrode 20 in the subsequent round of the spark discharge are shifted in the angle of rotation about the central axis of the discharge electrode 20 by an angle other than a multiple of 360° (such as 30°).

Accordingly, the spark discharge occurs at different spots on the surface of the discharge electrode 20 excluding the tip 20a between the specific round of the spark discharge and the subsequent round of the spark discharge, the spots being closest to the reference electrode 30a to generate the spark discharge in each round. Therefore, the position on the discharge electrode 20 from which the deposit is removed is different between the specific round of the spark discharge and the subsequent round of the spark discharge.

This reduces the possibility that only the deposit on a specific part of the discharge electrode 20 is removed while leaving the deposit on the other parts unremoved. That is, the unevenness can be reduced in terms of the position on the discharge electrode 20 from which the deposit is removed.

As described above, the controller 50 generates the spark discharge between the discharge electrode 20 and the reference electrode 30a while changing the relative position of the reference electrode 30a with respect to the discharge electrode 20. As a result, the unevenness can be reduced in terms of the position on the discharge electrode 20 from which the deposit is removed.

Eighteenth Embodiment

Figure 35:
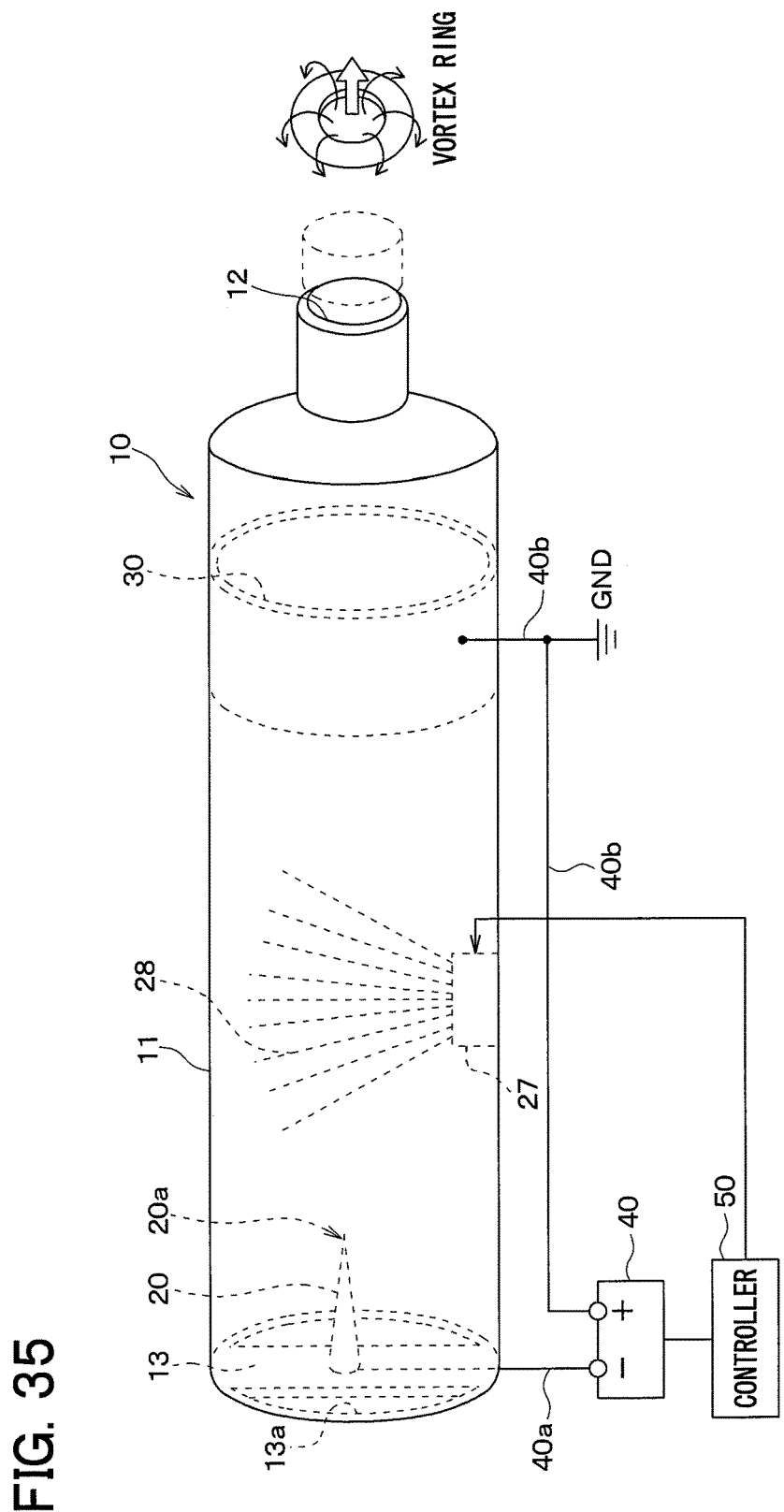
FIG. 35 is a diagram illustrating a configuration of a jet generator according to an eighteenth embodiment.

An eighteenth embodiment will now be described with reference to FIG. 35. A jet generator of the present embodiment is different from the jet generator of the eleventh embodiment in that a supply unit 27 is added. The jet generator of the present embodiment is further different from the jet generator of the eleventh embodiment in terms of details of control performed by a controller 50.

The supply unit 27 is a unit that blows water 28 in the form of vapor and mist between a discharge electrode 20 and a reference electrode 30 in a case 10. The supply unit 27 is controlled by the controller 50. The water 28 in the form of vapor and mist has lower electrical resistivity than air between the discharge electrode 20 and the reference electrode 30. Accordingly, the supply unit 27 supplying the water 28 in the form of vapor and mist between the discharge electrode 20 and the reference electrode 30 reduces electrical resistance of the space between the discharge electrode 20 and the reference electrode 30.

Hereinafter, the operation of the jet generator configured as described above will be described. The controller 50 operates in two modes, a normal mode and an electrode recovery mode. In the normal mode, the controller 50 does not bring the supply unit 27 into operation. Thus in the normal mode, the water in the form of vapor and mist is not supplied to the space between the discharge electrode 20 and the reference electrode 30.

Moreover, in the normal mode, the controller 50 first controls a power supply circuit 40 such that a voltage of −2 kV is output from the power supply circuit 40 as illustrated in FIG. 24, as with the eleventh embodiment. A corona discharge does not occur at this time around the discharge electrode 20. Next, the controller 50 controls the power supply circuit 40 such that a voltage of −3 kV is output from the power supply circuit 40 for a certain period of time (or 0.2 seconds). A corona discharge occurs as a result, whereby an ion wind is generated as in the eleventh embodiment.

In the electrode recovery mode, the controller 50 brings the supply unit 27 into operation. Thus in the electrode recovery mode, the water 28 in the form of vapor and mist is supplied to the space between the discharge electrode 20 and the reference electrode 30. The electrical resistance of the space between the discharge electrode 20 and the reference electrode 30 is reduced as a result.

In the electrode recovery mode, the controller 50 further controls the power supply circuit 40 such that a voltage of −2 kV is output from the power supply circuit 40 as with the normal mode. Neither corona discharge nor spark discharge occurs around the discharge electrode 20 at this time. Next, the controller 50 controls the power supply circuit 40 such that a voltage of −3 kV is output from the power supply circuit 40 for a certain period of time (or 0.2 seconds). As a result, a spark discharge is generated between the discharge electrode 20 and the reference electrode 30 enclosing the space in which the electrical resistance is reduced. The spark discharge removes a part or all of the deposit on the discharge electrode 20. A tip of the discharge electrode 20 is thus exposed again. As a result, a corona discharge can be generated in the normal mode.

After that, in the electrode recovery mode, the controller 50 controls the power supply circuit 40 such that a voltage of −2 kV is output from the power supply circuit 40. This causes the spark discharge to cease.

The controller 50 may switch the mode between the normal mode and the electrode recovery mode on the basis of a switching operation performed on an operation unit (not shown) by a user.

As described above, in order to generate the spark discharge between the discharge electrode 20 and the reference electrode 30, the supply unit 27 supplies the substance (that is, water vapor and mist) between the discharge electrode 20 and the reference electrode 30 to reduce the electrical resistance between the discharge electrode 20 and the reference electrode 30. The spark discharge can thus be generated by the same voltage control as that usually generating an ion wind.

Other Embodiments (1) The aforementioned embodiments generate the corona discharge between the discharge electrode 20 and the reference electrode 30 by applying a voltage lower than that of the reference electrode 30 to the discharge electrode 20. However, the corona discharge may be generated between the discharge electrode 20 and the reference electrode 30 by applying a voltage higher than that of the reference electrode 30 to the discharge electrode 20.

Figure 12:
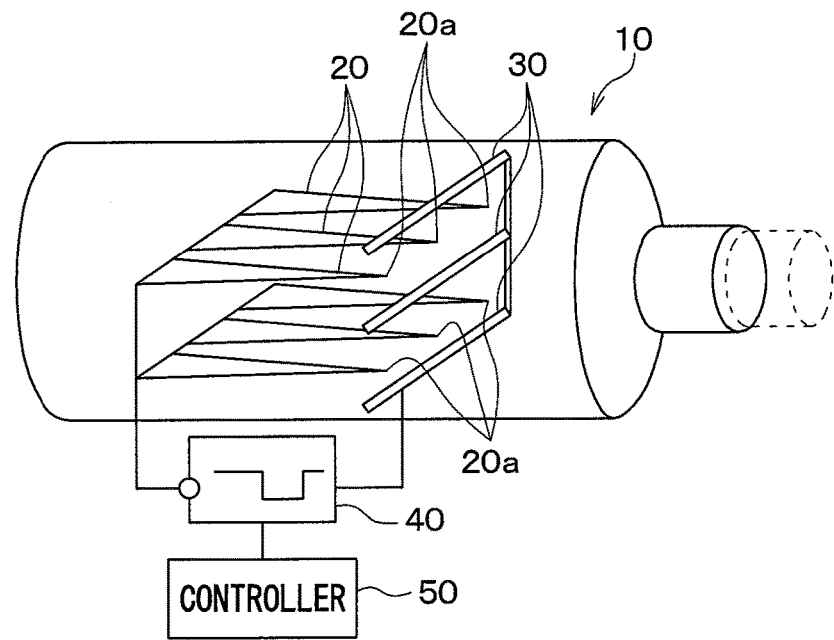
FIG. 12 is a diagram illustrating a modified example including a plurality of discharge electrodes and a plurality of reference electrodes disposed in parallel.
Figure 13:
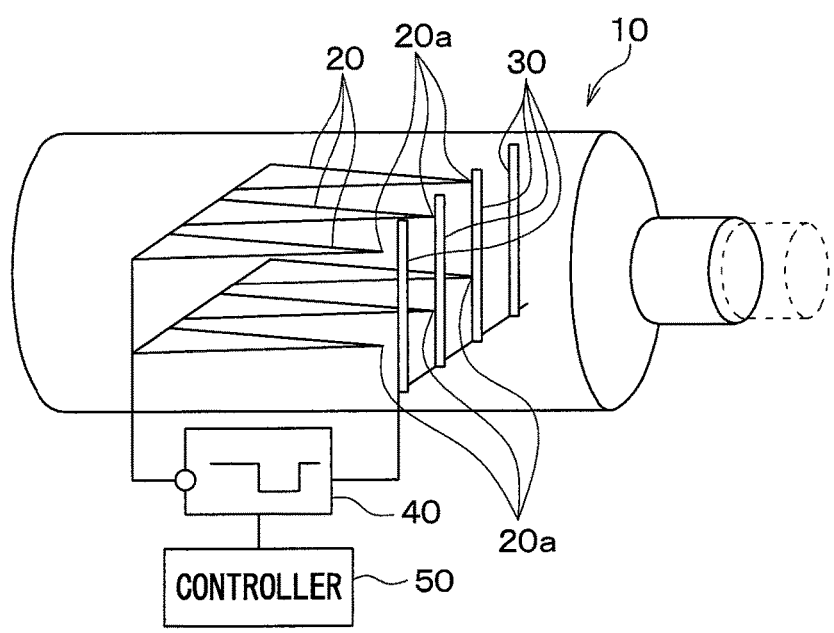
FIG. 13 is a diagram illustrating a modified example including a plurality of discharge electrodes and a plurality of reference electrodes disposed in parallel.

(2) The aforementioned embodiments include the one discharge electrode 20 with the tip 20a having the needle shape and the one reference electrode 30 having the hollow cylindrical shape. However, as illustrated in FIGS. 12 and 13, the jet generator may include a plurality of discharge electrodes 20 each with a tip 20a having a needle shape and a plurality of reference electrodes 30 disposed parallel to one another. Specifically, the plurality of discharge electrodes 20 may be disposed in an array, and the reference electrodes 30 corresponding to the discharge electrodes 20 may be disposed in parallel. The jet generator including the plurality of discharge electrodes 20 and the plurality of reference electrodes 30 can increase the volume of the ion wind and make the jet stronger. The configuration illustrated in FIG. 13 is different from the configuration illustrated in FIG. 12 in that the reference electrodes 30 are rotated by 90 degrees with respect to the axial direction of the case 10.

Figure 14:
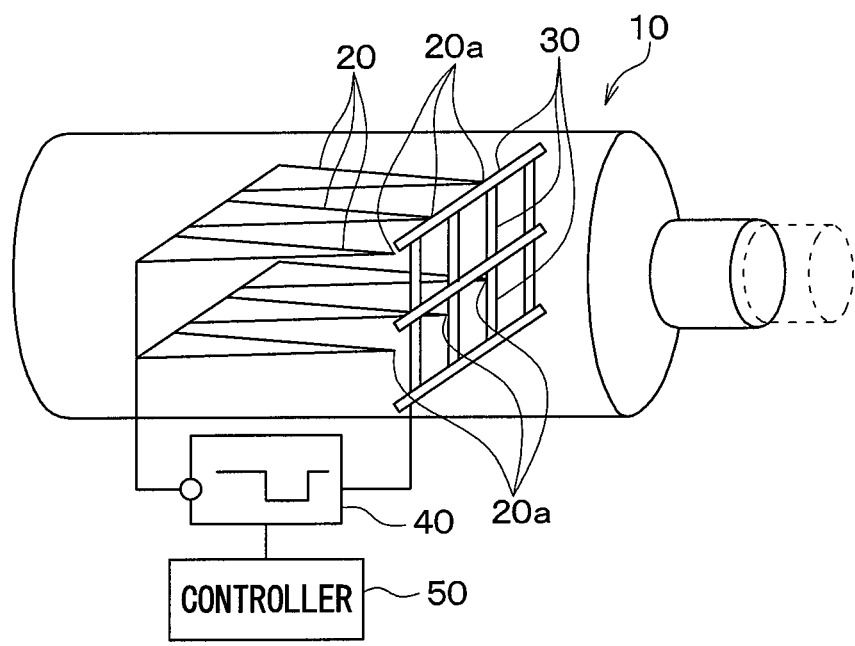
FIG. 14 is a diagram illustrating a modified example including a plurality of discharge electrodes and reference electrodes arranged in a mesh pattern.

(3) The aforementioned embodiments include the one discharge electrode 20 with the tip 20a having the needle shape and the one reference electrode 30 having the hollow cylindrical shape. However, as illustrated in FIG. 14, the jet generator may include a plurality of discharge electrodes 20 each with a tip 20a having a needle shape and reference electrodes 30 in a mesh pattern. Specifically, the plurality of discharge electrodes 20 may be disposed in an array, and the reference electrodes 30 corresponding to the discharge electrodes 20 may be disposed in parallel. The jet generator including the plurality of discharge electrodes 20 and the reference electrodes 30 in the mesh pattern can increase the volume of the ion wind and make the jet stronger.

(4) The aforementioned embodiments may further include an aromatic unit that stores a plate releasing an aromatic component such as aromatic oil at the opening 13a of the case 10 or inside the case 10. The aromatic unit storing the plate that releases the aromatic component allows the aromatic component to be released from the injection nozzle 12.

(5) The aforementioned embodiments illustrate the example of mounting the present jet generator to a meter or the like of a vehicle so as to inject a jet toward the face of an occupant of the vehicle for improved comfort. The jet generator may however be configured to inject cool air or warm air toward the face or the like of the occupant of the vehicle for the purpose of air conditioning. In this case, for example, cool air or warm air generated by an air conditioner can be taken into the case 10 through the opening 13a formed in the case 10.

(6) The aforementioned embodiments illustrate the example of mounting the present jet generator to a meter or the like of a vehicle so as to inject a jet toward the face of an occupant of the vehicle. The jet generator may however be configured to inject moist air toward the face or the like of the occupant of the vehicle. In this case, for example, moist air generated by a humidifier can be taken into the case 10 through the opening 13a formed in the case 10.

(7) The aforementioned embodiments illustrate the example of mounting the present jet generator to a meter or the like of a vehicle so as to inject a jet toward the face of an occupant of the vehicle. However, for example, the present jet generator may be individually provided to the occupant in each seat of the vehicle so as to generate a jet individually for each occupant of the vehicle.

(8) The aforementioned embodiments illustrate the example of mounting the present jet generator to a meter or the like of a vehicle so as to inject a jet toward the face of an occupant of the vehicle. The present jet generator may be mounted on a ceiling, a steering wheel, a headrest or the like of the vehicle. There may also be included a mounting unit with which the present jet generator is easily mounted to the meter, ceiling, steering wheel, headrest, or the like of the vehicle.

(9) The aforementioned embodiments illustrate the example of mounting the present jet generator to a meter or the like of a vehicle so as to inject a jet toward the face of an occupant of the vehicle. The present jet generator can also be used as a device for shaking off drowsiness or an air curtain.

(10) The aforementioned embodiments illustrate the example of separately configuring the timing adjustment unit 60 and the controllers 50 of the jet generators 1a to 1c. However, the timing adjustment unit 60 and the controllers 50 of the jet generators 1a to 1c may be configured by one computer.

(11) The second and third embodiments synchronize the timing of switching the output voltage of the power supply circuit 40 with the timing of switching the output voltage of the power supply circuit 41. However, the timings need not be synchronized with each other, but the timing of switching the output voltage of the power supply circuit 41 may be slightly delayed from the timing of switching the output voltage of the power supply circuit 40, for example.

Figure 36:
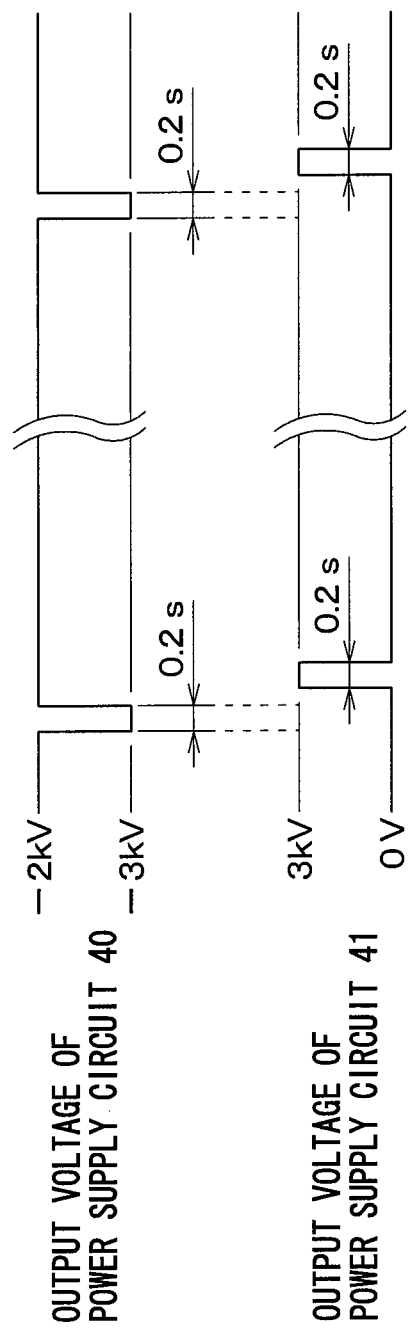
FIG. 36 is a diagram illustrating another example of an operation timing of a power supply circuit.

Specifically, the controller 50 of the jet generator configured as illustrated in the second and third embodiments controls the power supply circuits 40 and 41 by the timing illustrated in FIG. 36. More specifically, the controller 50 controls the power supply circuit 40 such that a voltage of −2 kV is output from the power supply circuit 40. As a result, the potential of a discharge electrode 20 equals −2 kV, and the potential of the reference electrode 30 equals 0 V. A corona discharge does not occur around the discharge electrode 20 when the output voltage of the power supply circuit 40 is set to −2 kV. At the same time, the controller 50 controls the power supply circuit 41 such that the output voltage of the power supply circuit 41 equals 0 V. As a result, the potential of each of the control electrode 31 and the reference electrode 30 equals 0 V.

The controller 50 thereafter controls the power supply circuit 40 such that a voltage of −3 kV is output from the power supply circuit 40 for a certain period of time, and also controls the power supply circuit 41 such that the output voltage of the power supply circuit 41 equals 0 V for the same certain period of time. The certain period of time is set to 0.2 seconds, for example. As a result, the potential of each of the control electrode 31 and the reference electrode 30 is maintained at 0 V. An ion wind is thus generated during the certain period of time by the action equivalent to that of the first embodiment in which the control electrode 31 is not included.

The controller 50 thereafter controls the power supply circuit 40 such that a voltage of −2 kV is output from the power supply circuit 40. At the same time, the controller 50 controls the power supply circuit 41 such that the output voltage of the power supply circuit 41 is maintained at 0 V. As a result, the potential of the discharge electrode 20 is switched to −2 kV, and the potential of each of the control electrode 31 and the reference electrode 30 is maintained at 0 V. The electric field in the vicinity of the discharge electrode 20 is reduced so that the corona discharge between the discharge electrode 20 and the reference electrode ceases. However, due to the effect of the corona discharge before ceasing, the ion wind remains between the discharge electrode 20 and the reference electrode 30 and between the reference electrode 30 and the control electrode 31.

The controller 50 thereafter immediately controls the power supply circuit 40 such that a voltage of −2 kV continues to be output from the power supply circuit 40 for a certain period of time, and also controls the power supply circuit 41 such that a voltage of 3 kV is output from the power supply circuit 41 for the same certain period of time. The certain period of time is set to 0.2 seconds, for example. As a result, the potential of the discharge electrode 20 equals −2 kV, the potential of the reference electrode 30 equals 0 V, and the potential of the control electrode 31 equals 3 kV. An electric field is thus generated between the reference electrode 30 and the control electrode 31. During the certain period of time, negative ions generated before the end of the corona discharge and moving between the reference electrode 30 and the control electrode 31 are accelerated in the process of moving toward the control electrode 31, thereby generating a larger ion wind.

The controller 50 thus controls the output voltage of the power supply circuit 41 such that the ions generated by the corona discharge are accelerated toward the injection nozzle 12 after switching the output voltage of the power supply circuit 40 from a second voltage (such as 3 kV) to a first voltage (such as 2 kV).

(12) The jet generator of the second and third embodiments includes the one control electrode 31 but may include two or more of the control electrodes 31.

(13) The jet generator of the aforementioned embodiments includes the injection nozzle 12 as the injection port but may include a simple opening (that is, an orifice) instead of the injection nozzle 12.

(14) The case 10 houses the discharge electrode 20 and the reference electrode 30 in the first embodiment. However, the case 10 need only accommodate at least the reference electrode 30. In the second and third embodiments, the case 10 houses the discharge electrode 20, the reference electrode 30, and the control electrode 31 but need only accommodate at least the control electrode 31.

(15) The jet generator of the fifth to tenth embodiments changes the position of the discharge electrode 20 without changing the position of the reference electrode 30 to vary the shortest distance between the tip 20a and the reference electrode 30. On the contrary, the jet generator may change the position of the reference electrode 30 without changing the position of the discharge electrode 20 to vary the shortest distance between the tip 20a and the reference electrode 30.

(16) The state responsive members 15, 17, 18, 19, and 22 of the aforementioned embodiments are moisture sensitive flexible members each containing the moisture sensitive material that deforms in response to a change in humidity of the surrounding gas. However, the state responsive members 15, 17, 18, 19, and 22 are not limited to such members.

The state responsive members 15, 17, 18, 19, and 22 may for example be a material (such as bimetal) that deforms in response to a change in temperature of the surrounding gas. When the temperature of the gas around the electrodes is high, dielectric breakdown and thus a spark discharge are more likely to occur even with the same distance between the electrodes and the same voltage applied between the electrodes. Accordingly, in this case, the state responsive members 15, 17, 18, 19, and 22 deform in response to an increase in temperature of the gas around the jet generator to increase the shortest distance between the tip 20a and the reference electrode 30. The state responsive members 15, 17, 18, 19, and 22 also deform in response to a decrease in temperature of the gas around the jet generator to decrease the shortest distance between the tip 20a and the reference electrode 30.

Alternatively, the state responsive members 15, 17, 18, 19, and 22 may be a material that deforms in response to a change in pressure of the surrounding gas, for example. Yet alternatively, the state responsive members 15, 17, 18, 19, and 22 may be a material that deforms in accordance with the composition (such as oxygen concentration) of the surrounding gas, for example.

(17) The techniques of the second to fourth embodiments may be applied to the jet generators of the fifth to eighteenth embodiments.

(18) The techniques of the fifth to tenth embodiments may be applied to the jet generators of the eleventh to eighteenth embodiments. The fifth to tenth embodiments disclose the technique of preventing generation of a spark discharge. On the other hand, the eleventh to eighteenth embodiments disclose the technique of actively generating a spark discharge for the purpose of removing the deposit. These two techniques can coexist without contradiction. This is because the occurrence of a spark discharge is inconvenient when it is desired to generate a corona discharge, though it is desired to actively generate a spark discharge in other cases. It is thus preferable to prevent the generation of a spark discharge when a corona discharge is to be generated, and to actively generate a spark discharge when the deposit is to be removed.

(19) The jet generator of the eleventh embodiment generates a spark discharge by increasing the voltage applied between the discharge electrode 20 and the reference electrode 30. The jet generator of the twelfth embodiment generates a spark discharge by decreasing the shortest distance between the tip 20a of the discharge electrode 20 and the reference electrode 30. The jet generator of the eighteenth embodiment generates a spark discharge by supplying a substance that reduces the electrical resistance between the discharge electrode 20 and the reference electrode 30. These three techniques of generating a spark discharge can be combined at will.

(20) The thirteenth, fourteenth, and fifteenth embodiments illustrate various techniques of determining the timing of generating a corona discharge. These various techniques may be applied to the jet generators of the twelfth, sixteenth, and seventeenth embodiments.

(21) In the first to eighteenth embodiments, the discharge electrode 20, the reference electrode 30, and the control electrode 31 having the circular tube shapes may each be replaced by an electrode having a flat plate shape.

(22) In the seventeenth embodiment, the jet generator may rotate the reference electrode 30a about the central axis of the case 10 instead of rotating the discharge electrode 20 during a spark discharge. The relative position of the discharge electrode 20 with respect to the reference electrode 30a can also be changed in such manner during the spark discharge. The unevenness can thus be reduced in terms of the position on the discharge electrode 20 from which the deposit is removed.

(23) In the seventeenth embodiment, the jet generator may move the discharge electrode 20 along the central axis of the discharge electrode 20 instead of rotating the discharge electrode 20 during a spark discharge. Alternatively, the jet generator may move the discharge electrode 20 along a direction intersecting the central axis of the discharge electrode 20 during the spark discharge. The relative position of the discharge electrode 20 with respect to the reference electrode 30*a* can also be changed in such manner during the spark discharge. The unevenness can thus be reduced in terms of the position on the discharge electrode 20 from which the deposit is removed.

(24) The eighteenth embodiment illustrates the water vapor and mist as the substances reducing the electrical resistance between the discharge electrode 20 and the reference electrode 30. However, another substance (such as a gas) may be used as the substance reducing the electrical resistance between the discharge electrode 20 and the reference electrode 30.

(25) The humidity of the air described above is relative humidity. The humidity of the gas described above increases with an increase in the amount of water vapor contained in the gas.

It should be appreciated that the present disclosure is not limited to the embodiments described above and can be modified appropriately. The embodiments above are not irrelevant to one another and can be combined appropriately unless a combination is obviously impossible. In the respective embodiments above, elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to shapes and positional relations, the components are not limited to the shapes and the positional relations unless explicitly specified or limited to particular shapes and positional relations in principle.

In the above embodiments, the power supply circuit 40 corresponds to a first power supply circuit, and the power supply circuit 41 corresponds to a second power supply circuit.

What is claimed is:

1. A jet flow generation device comprising:
a discharge electrode;
a reference electrode disposed away from the discharge electrode;
a power supply circuit that generates an output voltage to control a potential difference between the discharge electrode and the reference electrode;
a controller that switches the output voltage of the power supply circuit between a first voltage that does not induce corona discharge between the discharge electrode and the reference electrode and a second voltage that induces corona discharge between the discharge electrode and the reference electrode; and
a case that houses at least the reference electrode, wherein the case has an injection port that injects an ion wind of ions generated by the corona discharge, and
the controller switches the output voltage of the power supply circuit between the first voltage and the second voltage to send an air vortex ring from the injection port.

2. The jet flow generation device according to claim 1, wherein the power supply circuit is set as a first power supply circuit, the jet flow generation device further comprising:
a control electrode disposed between the reference electrode and the injection port in the case; and
a second power supply circuit that outputs a voltage applied between the reference electrode and the control electrode, wherein
the controller controls the output voltage of the second power supply circuit to accelerate the ions generated by the corona discharge toward the injection port during a period in which the output voltage of the first power supply circuit is switched from the first voltage to the second voltage and maintained at the second voltage, or after the output voltage of the first power supply circuit is switched from the second voltage to the first voltage.

3. The jet flow generation device according to claim 2, wherein the controller controls the output voltage of the second power supply circuit to move ions between the reference electrode and the control electrode toward the reference electrode before controlling the output voltage of the second power supply circuit to accelerate the ions generated by the corona discharge toward the injection port.

4. The jet flow generation device according to claim 1, wherein the case has an opening that is formed at a position different from a position of the injection port and takes air outside the case into the case.

5. A jet flow generation system comprising:
a plurality of the jet flow generation devices according to claim 1;
a confluence part that merges jet flows injected from injection ports of the jet flow generation devices; and
a plurality of guide paths that respectively guide the jet flows injected from the injection ports of the jet flow generation devices to the confluence part.

6. The jet flow generation system according to claim 5, further comprising:
a timing adjustment unit that adjusts a timing of switching the output voltage of the first power supply circuit for the plurality of jet flow generation devices in accordance with lengths of the plurality of guide paths such that the jet flows injected from the injection ports of the jet flow generation devices reach the confluence part at the same timing.

7. The jet flow generation device according to claim 1, further comprising:
a state responsive member that changes in shape in response to a change in a state of gas around the jet flow generation system, wherein
the state responsive member changes in shape to vary a distance between the discharge electrode and the reference electrode.

8. The jet flow generation device according to claim 7, wherein the state responsive member increases the distance between the discharge electrode and the reference electrode when humidity of the gas around the jet flow generation system increases.

9. The jet flow generation device according to claim 7, further comprising:
an elastic member, wherein the state responsive member changes in a longitudinal length in response to a change in the state of the gas, and the elastic member biases the state responsive member in a direction to increase the longitudinal length of the state responsive member.

10. The jet flow generation device according to claim 1, wherein the discharge electrode rotates about an axis disposed at a position away from a tip of the discharge electrode when the state responsive member changes in shape.

11. The jet flow generation device according to claim 1, wherein the controller switches the output voltage of the power supply circuit to a third voltage in order to generate a spark discharge between the discharge electrode and the reference electrode, and an absolute value of the third voltage is larger than an absolute value of the second voltage.

12. The jet flow generation device according to claim 1, wherein the controller causes a distance between the discharge electrode and the reference electrode to be shorter than when a corona discharge is to be generated between the discharge electrode and the reference electrode, in order to generate a spark discharge between the discharge electrode and the reference electrode.

13. The jet flow generation device according to claim 1, wherein the controller generates a spark discharge between the discharge electrode and the reference electrode at timing based on a cumulative time of a corona discharge generated between the discharge electrode and the reference electrode.

14. The jet flow generation device according to claim 1, wherein the controller generates a spark discharge between the discharge electrode and the reference electrode at timing based on a current flowing through the discharge electrode while generating a corona discharge between the discharge electrode and the reference electrode.

15. The jet flow generation device according to claim 1, wherein the controller generates a spark discharge between the discharge electrode and the reference electrode at a timing based on a voltage applied between the discharge electrode and the reference electrode while generating a corona discharge between the discharge electrode and the reference electrode.

16. The jet flow generation device according to claim 1, further comprising:

an additional electrode that is disposed at a position different from a position of the reference electrode and is non-conductive with the reference electrode, wherein the controller generates a spark discharge between the discharge electrode and the reference electrode in a certain period of time, and generates a spark discharge between the discharge electrode and the additional electrode in a period of time different from the certain period of time.

17. The jet flow generation device according to claim 1, wherein the controller generates a spark discharge between the discharge electrode and the reference electrode while changing a relative position of the reference electrode with respect to the discharge electrode.

18. The jet flow generation device according to claim 1, further comprising:

a supply unit that supplies, between the discharge electrode and the reference electrode, a substance reducing electrical resistance between the discharge electrode and the reference electrode in order to generate a spark discharge between the discharge electrode and the reference electrode.

19. The jet flow generation device according to claim 1, wherein the controller switches the output voltage of the power supply circuit between the first voltage and the second voltage such that the ion wind is intermittently injected from the injection port.

* * * * *